US012591822B2

(12) United States Patent
Cao et al.

(10) Patent No.: US 12,591,822 B2
(45) Date of Patent: Mar. 31, 2026

(54) AUTOMATIC ADJUSTMENT OF CONSTRAINTS IN TASK SOLUTION GENERATION

(71) Applicant: INTERNATIONAL BUSINESS MACHINES CORPORATION, Armonk, NY (US)

(72) Inventors: Shun Xin Cao, Hefei (CN); Jing Zhang, Beijing (CN); Zhan Peng Huo, Beijing (CN); Sheng Shuang Li, Changping (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 354 days.

(21) Appl. No.: 17/931,723

(22) Filed: Sep. 13, 2022

(65) Prior Publication Data

US 2024/0086791 A1 Mar. 14, 2024

(51) Int. Cl.
*G06Q 10/0631* (2023.01)

(52) U.S. Cl.
CPC .................................. *G06Q 10/0631* (2013.01)

(58) Field of Classification Search
CPC .................................................. G06Q 10/0631
See application file for complete search history.

(56) References Cited

U.S. PATENT DOCUMENTS

| | | | |
|---|---|---|---|
| 7,424,451 B1 | 9/2008 | Moore et al. | |
| 9,659,253 B1 * | 5/2017 | Ghaddar | G06N 5/01 |
| 10,877,634 B1 * | 12/2020 | Sica | G06F 16/587 |
| 2014/0068075 A1 | 3/2014 | Bonilla et al. | |

(Continued)

FOREIGN PATENT DOCUMENTS

| | | |
|---|---|---|
| CN | 104750948 A | 7/2015 |
| CN | 108491997 A | 9/2018 |

(Continued)

OTHER PUBLICATIONS

Notification of Transmittal of the International Search Report and the Written Opinion of the International Searching Authority, or the Declaration, PCT/CN2023/117958, Oct. 23, 2023, 7 pages.

(Continued)

*Primary Examiner* — Nadja N Chong Cruz
(74) *Attorney, Agent, or Firm* — Elliot J. Shine, Esq.; Blanche E. Schiller, Esq.; Heslin Rothenberg Farley & Mesiti P.C.

(57) ABSTRACT

A controller obtains data stored in one or more data structures generated based on a defined task to be performed for a selected event. The data includes a set of constraints for the defined task. One or more task solutions generated for the defined task using the provided data are obtained. A determination is made as to whether the one or more task solutions include a task solution that satisfies one or more defined criteria. Based on determining that the one or more task solutions do not include the task solution that satisfies the one or more defined criteria, the set of constraints is automatically adjusted to provide an adjusted set of constraints. The adjusted set of constraints is to be automatically provided to a solution generator to be used to obtain the task solution that satisfies the one or more defined criteria.

20 Claims, 14 Drawing Sheets

OBTAIN, BY A CONTROLLER EXECUTING ON ONE OR MORE PROCESSORS OF A COMPUTING ENVIRONMENT, DATA STORED IN ONE OR MORE DATA STRUCTURES GENERATED BASED ON A DEFINED TASK TO BE PERFORMED FOR A SELECTED EVENT ~1000

THE DATA INCLUDES A SET OF CONSTRAINTS FOR THE DEFINED TASK TO BE PERFORMED FOR THE SELECTED EVENT ~1002

PROVIDE THE DATA TO A SOLUTION GENERATOR TO BE EXECUTED ON AT LEAST ONE PROCESSOR ~1004

THE SOLUTION GENERATOR TO BE USED TO OBTAIN A TASK SOLUTION TO SPECIFY HOW TO PERFORM THE DEFINED TASK FOR THE SELECTED EVENT ~1006

THE TASK SOLUTION TO SATISFY ONE OR MORE DEFINED CRITERIA ~1008

OBTAIN ONE OR MORE TASK SOLUTIONS GENERATED BY THE SOLUTION GENERATOR FOR THE DEFINED TASK, THE ONE OR MORE TASK SOLUTIONS GENERATED USING THE DATA THAT IS PROVIDED ~1010

DETERMINE WHETHER THE ONE OR MORE TASK SOLUTIONS INCLUDE THE TASK SOLUTION THAT SATISFIES THE ONE OR MORE DEFINED CRITERIA ~1012

AUTOMATICALLY ADJUST THE SET OF CONSTRAINTS TO PROVIDE AN ADJUSTED SET OF CONSTRAINTS, BASED ON DETERMINING THAT THE ONE OR MORE TASK SOLUTIONS DO NOT INCLUDE THE TASK SOLUTION THAT SATISFIES THE ONE OR MORE DEFINED CRITERIA ~1014

THE ADJUSTED SET OF CONSTRAINTS TO BE AUTOMATICALLY PROVIDED TO THE SOLUTION GENERATOR TO BE USED TO OBTAIN THE TASK SOLUTION TO SPECIFY HOW TO PERFORM THE DEFINED TASK ~1016

OBTAIN THE TASK SOLUTION TO SPECIFY HOW TO PERFORM THE DEFINED TASK FOR THE SELECTED EVENT ~1018

OUTPUT AT LEAST AN INDICATION OF THE TASK SOLUTION TO PERFORM THE DEFINED TASK FOR THE SELECTED EVENT ~1020

(56) References Cited

U.S. PATENT DOCUMENTS

| | | | | |
|---|---|---|---|---|
| 2016/0104066 A1* | 4/2016 | Deubzer | ............... | G06N 3/126 |
| | | | | 706/13 |
| 2019/0347363 A1 | 11/2019 | Kishimoto et al. | | |
| 2021/0157644 A1 | 5/2021 | Unnikrishnan et al. | | |
| 2023/0281504 A1* | 9/2023 | Nair | ....................... | G06N 20/00 |
| | | | | 706/12 |

FOREIGN PATENT DOCUMENTS

| | | |
|---|---|---|
| CN | 111598341 A | 8/2020 |
| CN | 110688466 A | 6/2023 |

OTHER PUBLICATIONS

"Route Optimization," https://www.stamod.com/industries-covered/route-optimization/, downloaded from internet Jun. 29, 2022, 4 pages.

"Priority Constraint—Route Planning Business Rule," https://support.route4me.com/priority-constraint-advanced-constraint-add-on/, downloaded from internet Jun. 29, 2022, 16 pages.

Cao, Pei et al., "Solving Configuration Optimization Problem with Multiple Hard Constraints: An Enhanced Multi-Objective Simulated Annealing Approach," Jun. 2017, pp. 1-40 (+ cover).

Jiang, Xiaowei et al., "Multiplier Method for Solving Optimization Problems with Many Complicated Constraints," Journal of Jilin University, vol. 53, No. 2, Mar. 2015, pp. 183-188 (English translation of Abstract only).

Lau, Hoong Chuin et al., "Solving Multi-Objective Multi-Constrained Optimization Problems Using Hybrid Ants System and Tabu Search," 5th Metaheuristics International Conference, Kyoto, Aug. 2003, pp. 1-9 (+ cover).

Mertens, Koenraad et al., "The DynCOAA Algorithm for Dynamic Constraint Optimization Problems," 5th International Joint Conference on Autonomous Agents and Multiagent Systems, Jan. 2006, pp. 1-8.

Zhu, Yu-ping et al., "Application of Mixed Intelligence Algorithm in Multi-Constrained Optimization Problem," Application Research of Computers, vol. 25, No. 4, Apr. 2008, pp. 1039-1045 (English translation of Abstract only).

* cited by examiner

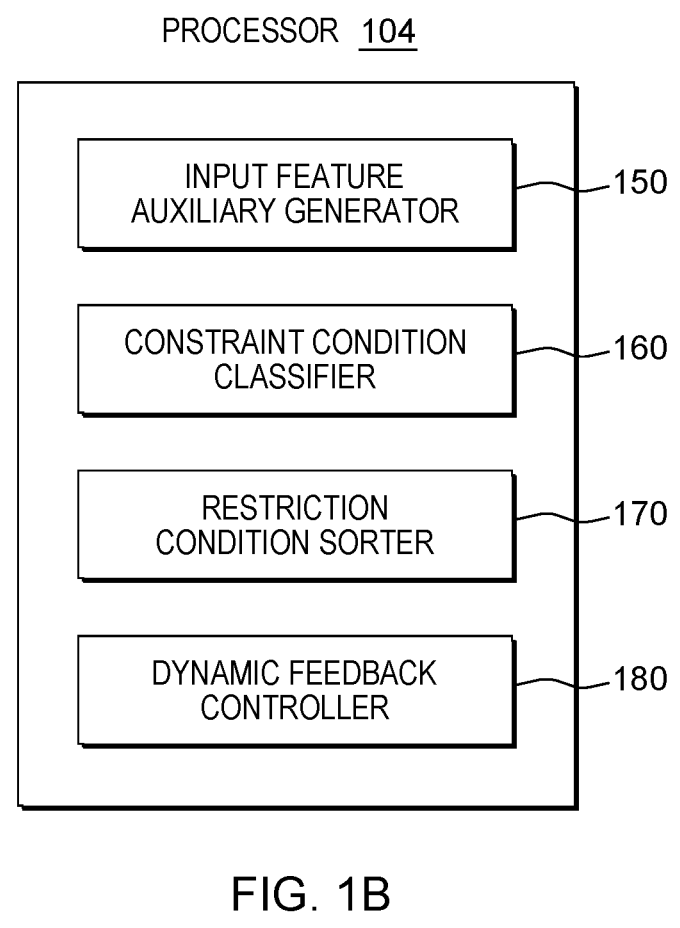

PROCESSOR  104

INPUT FEATURE
AUXILIARY GENERATOR — 150

CONSTRAINT CONDITION
CLASSIFIER — 160

RESTRICTION
CONDITION SORTER — 170

DYNAMIC FEEDBACK
CONTROLLER — 180

FIG. 1B

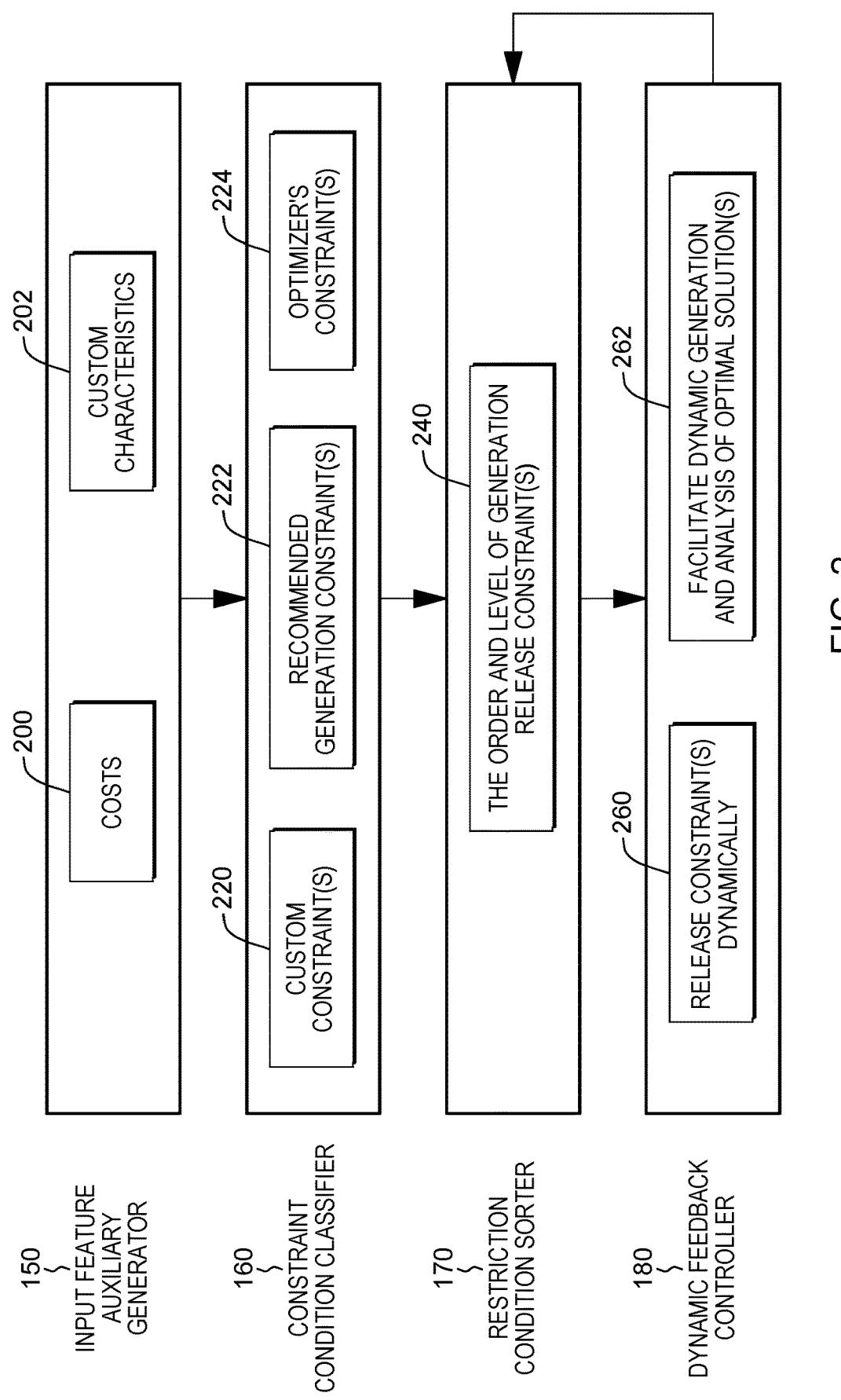

FIG. 2

150 INPUT FEATURE AUXILIARY GENERATOR

200 COSTS

202 CUSTOM CHARACTERISTICS

160 CONSTRAINT CONDITION CLASSIFIER

220 CUSTOM CONSTRAINT(S)

222 RECOMMENDED GENERATION CONSTRAINT(S)

224 OPTIMIZER'S CONSTRAINT(S)

170 RESTRICTION CONDITION SORTER

240 THE ORDER AND LEVEL OF GENERATION RELEASE CONSTRAINT(S)

180 DYNAMIC FEEDBACK CONTROLLER

260 RELEASE CONSTRAINT(S) DYNAMICALLY

262 FACILITATE DYNAMIC GENERATION AND ANALYSIS OF OPTIMAL SOLUTION(S)

Data structure - baseModel

```
300 ─┐
      baseModel:{
      featureA:{elementA(placeholder1, placeholder2, ...):property:{priority:yy},
              elementB(placeholder1, placeholder2, ...):property:{priority:yy},
       302 ─┘    ...}:property:{layer :xx};   └─ 318         └─ 314
      featureB:{elementA(placeholder1, placeholder2, ....):property:{priority:yy},
              elementB(placeholder1, placeholder2, ...):property:{priority:yy},
                  ...}:property:{layer :xx};
      featureC:{elementA(placeholder1, placeholder2, ....):property:{priority:yy},
              elementB(placeholder1, placeholder2, ...):property:{priority:yy},
       302 ─┘    ...}:property:{layer :xx};
      featureD:{elementA(placeholder1, placeholder2, ...):property:{priority:yy},
              elementB(placeholder1, placeholder2, ...):property:{priority:yy},
       304 ─┘    ...}:property:{layer :xx};
      optimizer:{elementA(placeholder1, placeholder2, ...):property:{priority:yy},
  308 ─ elementB(placeholder1, placeholder2, ...):property:{priority:yy},
                  ...}:property:{layer :xx};    └─ 312         └─ 316
        320 ─┘
      }
```

FIG. 3

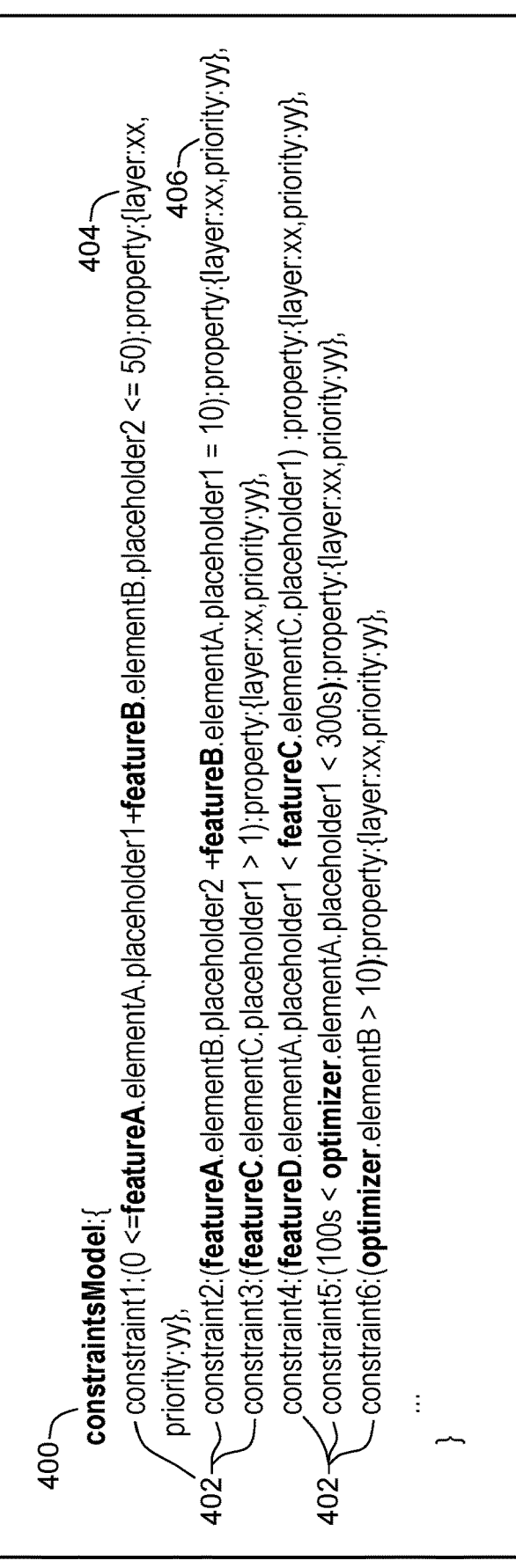

Data structure - constraintsModel constraintsModel:{
constraint1:(0 <=featureA.elementA.placeholder1+featureB.elementB.placeholder2 <= 50):property:{layer:xx, priority:yy},
constraint2:(featureA.elementB.placeholder2 +featureB.elementA.placeholder1 = 10):property:{layer:xx,priority:yy},
constraint3:(featureC.elementC.placeholder1 > 1):property:{layer:xx,priority:yy},
constraint4:(featureD.elementA.placeholder1 < featureC.elementC.placeholder1) :property:{layer:xx,priority:yy},
constraint5:(100s < optimizer.elementA.placeholder1 < 300s):property:{layer:xx,priority:yy},
constraint6:(optimizer.elementB > 10):property:{layer:xx,priority:yy},
...
}

FIG. 4

INPUT FEATURE AUXILIARY GENERATOR

CONSTRAINT CONDITION CLASSIFIER

RESTRICTION CONDITION SORTER

DYNAMIC FEEDBACK CONTROLLER

900

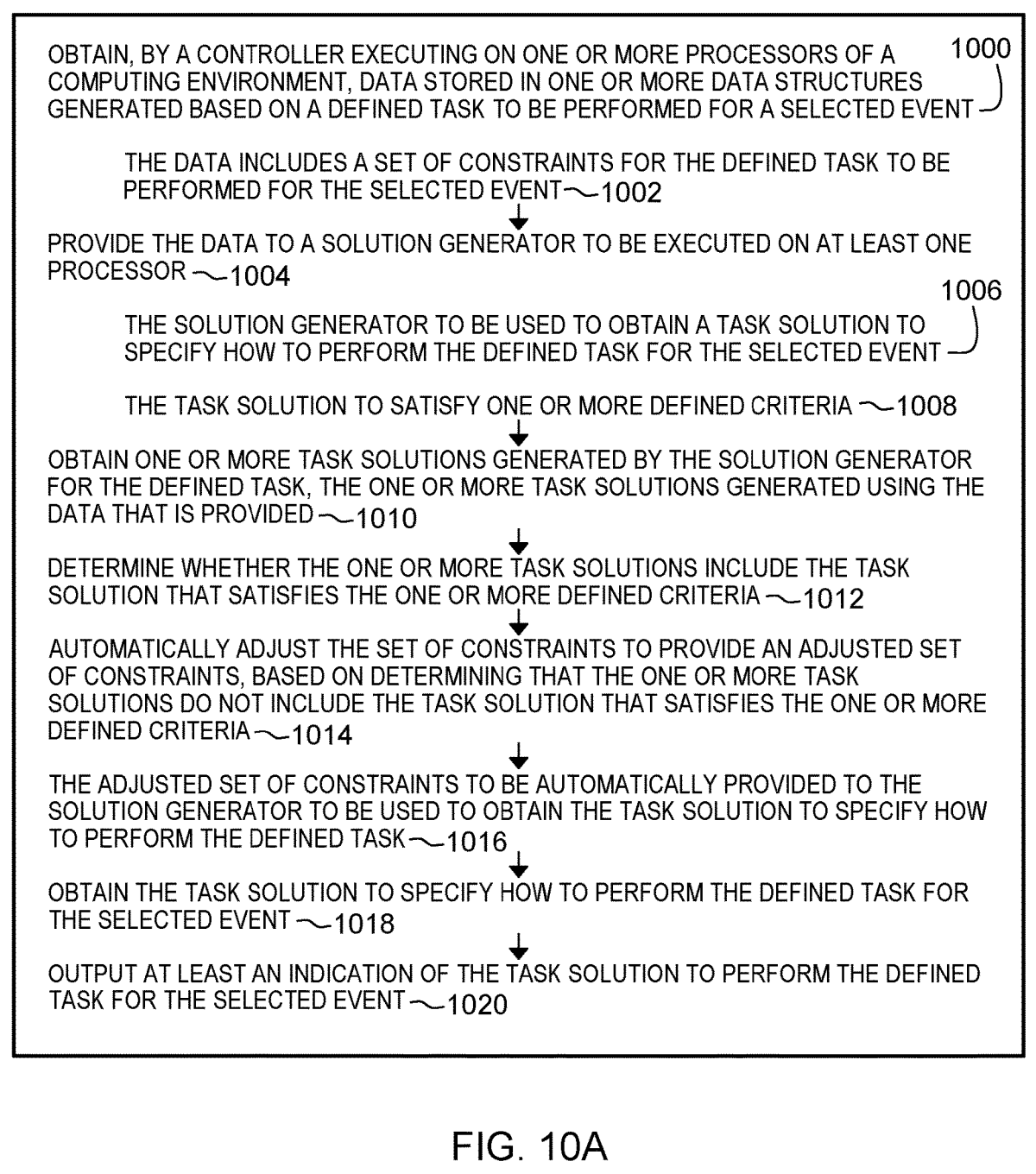

OBTAIN, BY A CONTROLLER EXECUTING ON ONE OR MORE PROCESSORS OF A    1000
COMPUTING ENVIRONMENT, DATA STORED IN ONE OR MORE DATA STRUCTURES
GENERATED BASED ON A DEFINED TASK TO BE PERFORMED FOR A SELECTED EVENT

THE DATA INCLUDES A SET OF CONSTRAINTS FOR THE DEFINED TASK TO BE
      PERFORMED FOR THE SELECTED EVENT ～1002

PROVIDE THE DATA TO A SOLUTION GENERATOR TO BE EXECUTED ON AT LEAST ONE
PROCESSOR ～1004

1006

THE SOLUTION GENERATOR TO BE USED TO OBTAIN A TASK SOLUTION TO
      SPECIFY HOW TO PERFORM THE DEFINED TASK FOR THE SELECTED EVENT

THE TASK SOLUTION TO SATISFY ONE OR MORE DEFINED CRITERIA ～1008

OBTAIN ONE OR MORE TASK SOLUTIONS GENERATED BY THE SOLUTION GENERATOR
FOR THE DEFINED TASK, THE ONE OR MORE TASK SOLUTIONS GENERATED USING THE
DATA THAT IS PROVIDED ～1010

DETERMINE WHETHER THE ONE OR MORE TASK SOLUTIONS INCLUDE THE TASK
SOLUTION THAT SATISFIES THE ONE OR MORE DEFINED CRITERIA ～1012

AUTOMATICALLY ADJUST THE SET OF CONSTRAINTS TO PROVIDE AN ADJUSTED SET
OF CONSTRAINTS, BASED ON DETERMINING THAT THE ONE OR MORE TASK
SOLUTIONS DO NOT INCLUDE THE TASK SOLUTION THAT SATISFIES THE ONE OR MORE
DEFINED CRITERIA ～1014

THE ADJUSTED SET OF CONSTRAINTS TO BE AUTOMATICALLY PROVIDED TO THE
SOLUTION GENERATOR TO BE USED TO OBTAIN THE TASK SOLUTION TO SPECIFY HOW
TO PERFORM THE DEFINED TASK ～1016

OBTAIN THE TASK SOLUTION TO SPECIFY HOW TO PERFORM THE DEFINED TASK FOR
THE SELECTED EVENT ～1018

OUTPUT AT LEAST AN INDICATION OF THE TASK SOLUTION TO PERFORM THE DEFINED
TASK FOR THE SELECTED EVENT ～1020

FIG. 10A

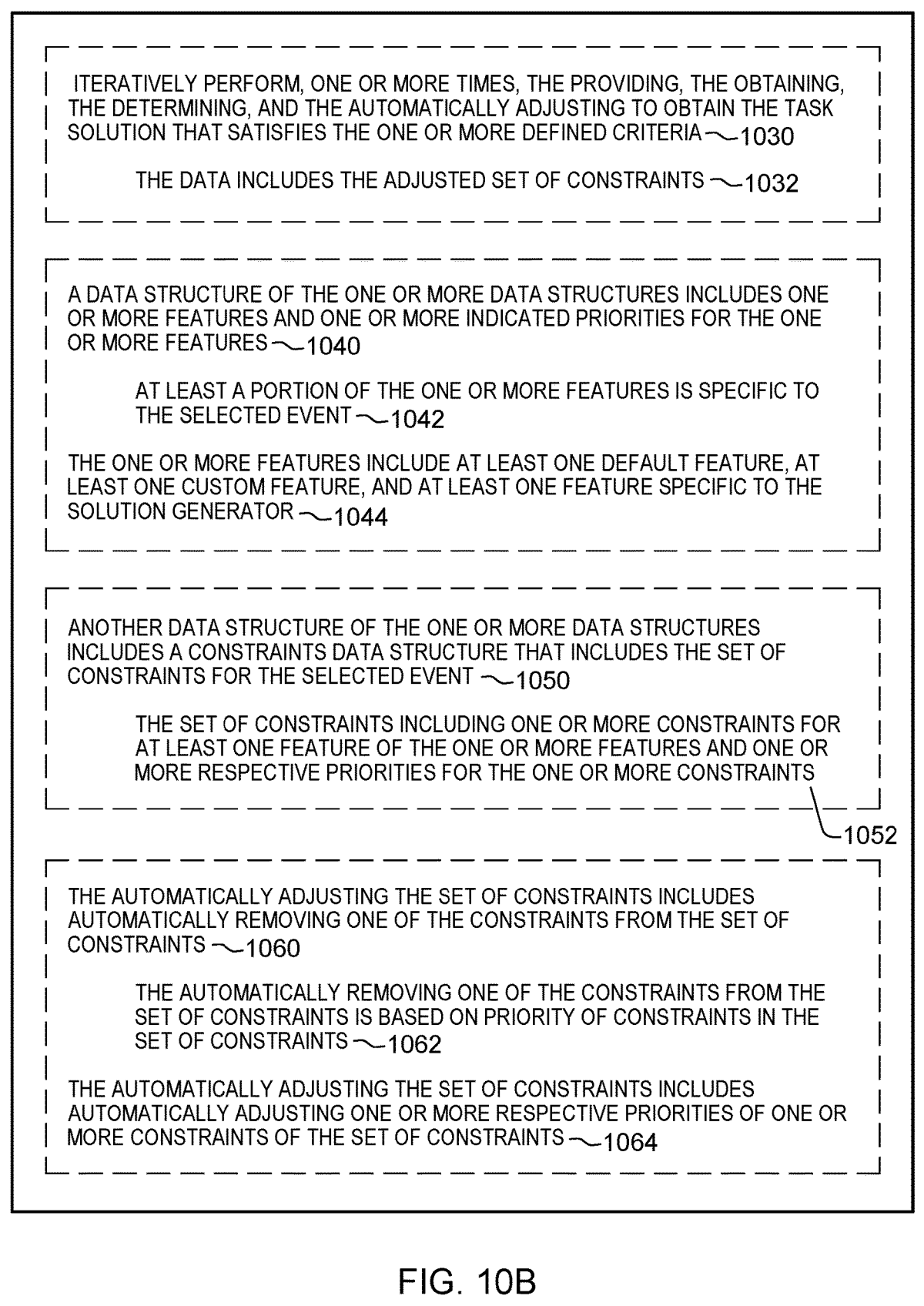

ITERATIVELY PERFORM, ONE OR MORE TIMES, THE PROVIDING, THE OBTAINING, THE DETERMINING, AND THE AUTOMATICALLY ADJUSTING TO OBTAIN THE TASK SOLUTION THAT SATISFIES THE ONE OR MORE DEFINED CRITERIA —1030

THE DATA INCLUDES THE ADJUSTED SET OF CONSTRAINTS —1032

A DATA STRUCTURE OF THE ONE OR MORE DATA STRUCTURES INCLUDES ONE OR MORE FEATURES AND ONE OR MORE INDICATED PRIORITIES FOR THE ONE OR MORE FEATURES —1040

AT LEAST A PORTION OF THE ONE OR MORE FEATURES IS SPECIFIC TO THE SELECTED EVENT —1042

THE ONE OR MORE FEATURES INCLUDE AT LEAST ONE DEFAULT FEATURE, AT LEAST ONE CUSTOM FEATURE, AND AT LEAST ONE FEATURE SPECIFIC TO THE SOLUTION GENERATOR —1044

ANOTHER DATA STRUCTURE OF THE ONE OR MORE DATA STRUCTURES INCLUDES A CONSTRAINTS DATA STRUCTURE THAT INCLUDES THE SET OF CONSTRAINTS FOR THE SELECTED EVENT —1050

THE SET OF CONSTRAINTS INCLUDING ONE OR MORE CONSTRAINTS FOR AT LEAST ONE FEATURE OF THE ONE OR MORE FEATURES AND ONE OR MORE RESPECTIVE PRIORITIES FOR THE ONE OR MORE CONSTRAINTS

—1052

THE AUTOMATICALLY ADJUSTING THE SET OF CONSTRAINTS INCLUDES AUTOMATICALLY REMOVING ONE OF THE CONSTRAINTS FROM THE SET OF CONSTRAINTS —1060

THE AUTOMATICALLY REMOVING ONE OF THE CONSTRAINTS FROM THE SET OF CONSTRAINTS IS BASED ON PRIORITY OF CONSTRAINTS IN THE SET OF CONSTRAINTS —1062

THE AUTOMATICALLY ADJUSTING THE SET OF CONSTRAINTS INCLUDES AUTOMATICALLY ADJUSTING ONE OR MORE RESPECTIVE PRIORITIES OF ONE OR MORE CONSTRAINTS OF THE SET OF CONSTRAINTS —1064

FIG. 10B

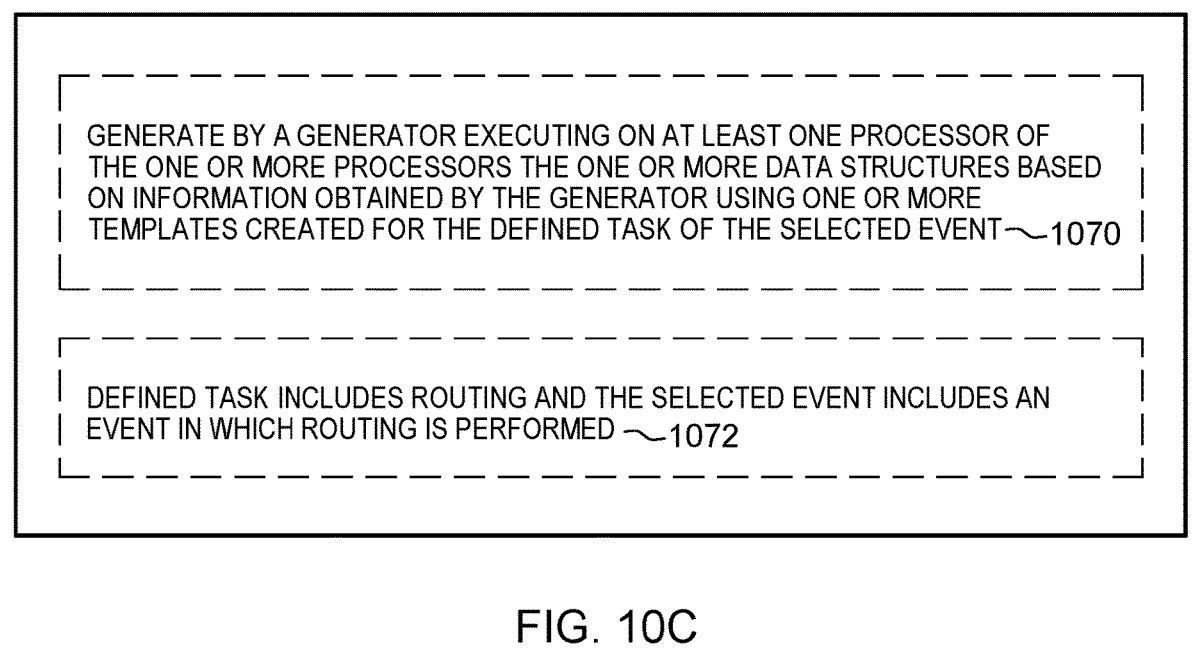

GENERATE BY A GENERATOR EXECUTING ON AT LEAST ONE PROCESSOR OF THE ONE OR MORE PROCESSORS THE ONE OR MORE DATA STRUCTURES BASED ON INFORMATION OBTAINED BY THE GENERATOR USING ONE OR MORE TEMPLATES CREATED FOR THE DEFINED TASK OF THE SELECTED EVENT～1070

DEFINED TASK INCLUDES ROUTING AND THE SELECTED EVENT INCLUDES AN EVENT IN WHICH ROUTING IS PERFORMED ～1072

FIG. 10C

AUTOMATIC ADJUSTMENT OF CONSTRAINTS IN TASK SOLUTION GENERATION

BACKGROUND

One or more aspects relate, in general, to dynamic processing within a computing environment, and in particular, to improving such processing.

Task solutions that specify how tasks are to be performed for defined events, such as real-world events, are difficult to devise. This is a result of the tasks and/or the defined events being complex in that they have many and/or complicated constraints associated therewith and/or conditions to be satisfied to successfully perform the tasks. Users find it difficult to determine the best way to perform the tasks due to the numerous and/or complex constraints and/or conditions. Further, due to the number and/or complexity of the constraints or conditions, often there are insufficient computing resources to determine a task solution to be employed.

Typically, to produce such task solutions, human intervention is extensively used. The input provided during the human intervention is limited to the background and personal knowledge of the person providing the input. Thus, the resulting task solution tends to be unstable, too complex, error prone and/or costly. Therefore, there continues to be a need to improve the task solutions used to specify how tasks are to be performed for defined events.

SUMMARY

Shortcomings of the prior art are overcome, and additional advantages are provided through the provision of a computer-implemented method of dynamic processing within a computing environment. The computer-implemented method includes obtaining, by a controller executing on one or more processors of the computing environment, data stored in one or more data structures generated based on a defined task to be performed for a selected event. The data includes a set of constraints for the defined task to be performed for the selected event. The data is provided to a solution generator to be executed on at least one processor, and the solution generator is to be used to obtain a task solution to specify how to perform the defined task for the selected event. The task solution is to satisfy one or more defined criteria. One or more task solutions generated by the solution generator for the defined task are obtained. The one or more task solutions are generated using the data that is provided. A determination is made as to whether the one or more task solutions include the task solution that satisfies the one or more defined criteria. Based on determining that the one or more task solutions do not include the task solution that satisfies the one or more defined criteria, the set of constraints are automatically adjusted to provide an adjusted set of constraints. The adjusted set of constraints is to be automatically provided to the solution generator to be used to obtain the task solution to specify how to perform the defined task. The task solution to specify how to perform the defined task for the selected event is obtained, and at least an indication of the task solution to perform the defined task for the selected event is outputted.

By storing the data in a selected form and retrieving and using that data, use of computer resources is reduced, and system performance is improved. Reducing the use of computer resources and/or improving system performance provides benefits to various technologies that use data stored in the selected form.

The automatically adjusting enables task solutions to be generated that otherwise could not be generated. Use of computer resources is reduced and performance is improved.

In one embodiment, the providing, the obtaining, the determining, and the automatically adjusting are iteratively performed, one or more times, to obtain the task solution that satisfies the one or more defined criteria. The data includes the adjusted set of constraints.

As an example, a data structure of the one or more data structures includes one or more features and one or more indicated priorities for the one or more features. At least a portion of the one or more features is specific to the selected event.

By storing the data in a selected form, use of computer resources is reduced, and system performance is improved.

In one example, the one or more features include at least one default feature, at least one custom feature, and at least one feature specific to the solution generator.

As another example, another data structure of the one or more data structures includes a constraints data structure that includes the set of constraints for the selected event. The set of constraints include one or more constraints for at least one feature of the one or more features and one or more respective priorities for the one or more constraints.

By storing the data in a selected form, use of computer resources is reduced, and system performance is improved.

In one example, the automatically adjusting the set of constraints includes automatically removing one of the constraints from the set of constraints. As an example, the automatically removing one of the constraints from the set of constraints is based on priority of constraints in the set of constraints.

In another example, the automatically adjusting the set of constraints includes automatically adjusting one or more respective priorities of one or more constraints of the set of constraints.

The automatically adjusting improves efficiency in determining a task solution and improves computer processing by, for instance, reducing the use of computer resources, improving system performance.

In one embodiment, the one or more data structures are generated by a generator executing on at least one processor of the one or more processors based on information obtained by the generator using one or more templates created for the defined task of the selected event.

As one example, the defined task includes routing, and the selected event includes an event in which routing is performed.

Computer systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1B depicts one example of processing engines of a processor of FIG. 1A, in accordance with one or more aspects of the present invention;

FIG. 2 depicts further details of the processing engines of FIG. 1B, in accordance with one or more aspects of the present invention;

FIG. 3 depicts one example of a base model data structure generated in accordance with one or more aspects of the present invention;

FIG. 4 depicts one example of a constraints model data structure generated in accordance with one or more aspects of the present invention;

FIGS. 10A-10C depict one example of dynamic processing within a computing environment, as it relates to one or more aspects of the present invention.

DETAILED DESCRIPTION

Figure 1A:
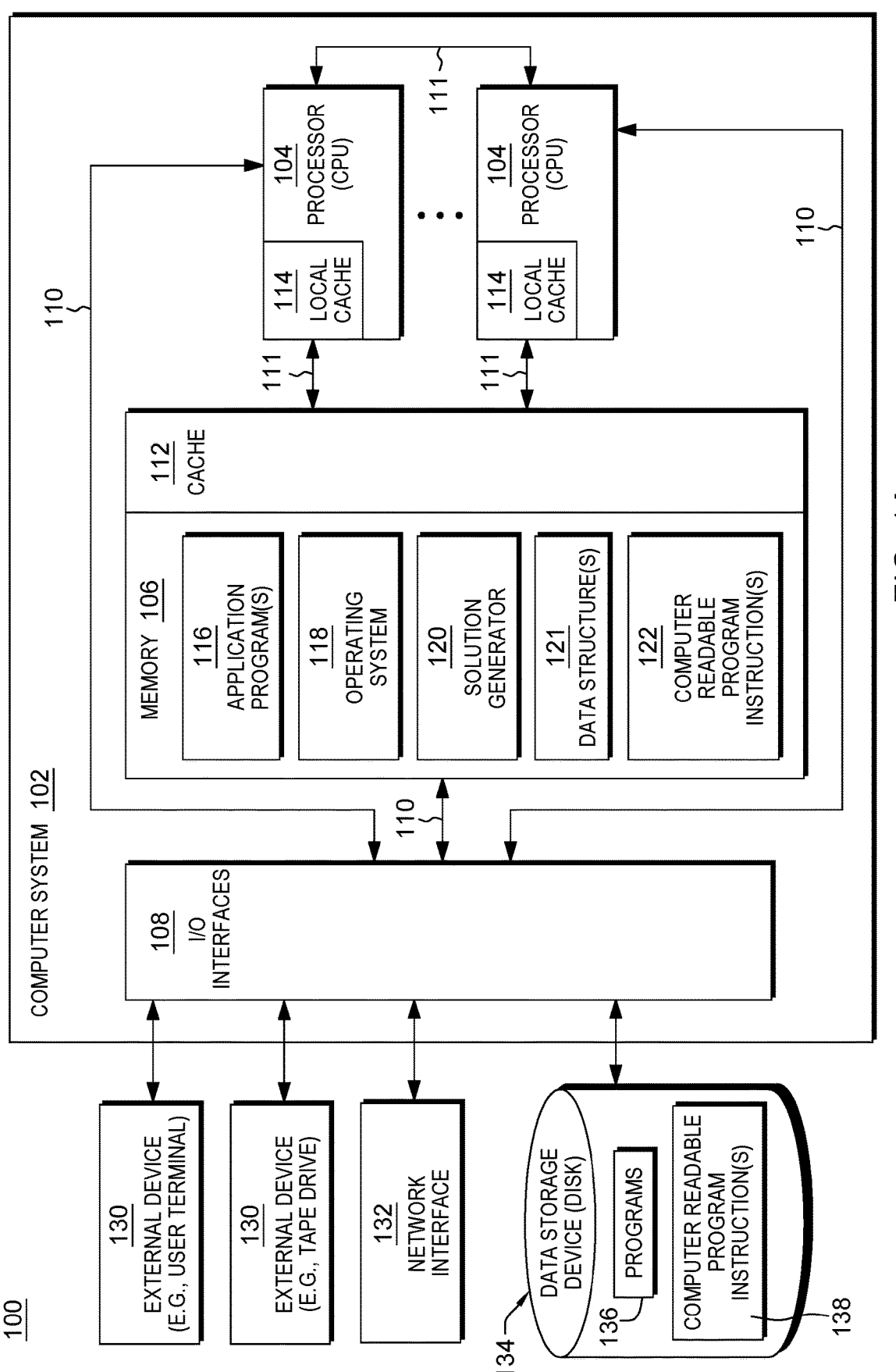
FIG. 1A depicts one example of a computing environment to include and/or use one or more aspects of the present invention.

In one or more aspects, a capability is provided to facilitate processing within a computing environment. Processing within a computing environment is facilitated by storing data in a selected form and providing a capability to retrieve and use that data. The data is used, in one or more aspects, in determining an optimal solution for a defined task, referred to herein as an optimal task solution, to be performed for a selected event, such as a complex scenario in a real-world environment. Example defined tasks for selected events or complex scenarios include, for instance, routing within a computing environment or network; path planning for vehicles, such as delivery vehicles, emergency vehicles, and/or other vehicles; material distribution for a supplier, manufacturer, etc.; timely delivery of services in one or more environments; etc. The optimal task solution specifies, for instance, how a defined task, such as routing, distributing, delivering, etc., may be performed for a selected event, such as computer network routing, vehicle route planning, distribution of materials by a supplier, etc. The storing of data in the selected form and the providing a capability to retrieve and use the data to determine an optimal task solution for a task to be performed for a selected event in a real-world environment is usable across complex scenarios and technologies.

By storing the data in a selected form and retrieving and using that data, use of computer resources is reduced, and system performance is improved. Reducing the use of computer resources and/or improving system performance provides benefits to various technologies that use data stored in the selected form. Such technologies include, but are not limited to, computer processing/routing, engineering, manufacturing, design technologies (e.g., design of products to be manufactured), medical technologies, transportation technologies, industrial technologies, etc.

In accordance with one or more aspects, a process is provided that generates a task solution, e.g., an optimal task solution, for a defined task to be performed for a selected event. The process performs actions, including, but not limited to, obtaining data relevant for the defined task and/or selected event, storing the data in the selected form, and retrieving and using that data to produce an optimal task solution. The process, referred to herein as a common process, is dynamic in that it is applicable and usable for generating task solutions for various types of real-world events. It is common in that it is suitable for any situation that uses an optimizer to determine a task solution. The process used need not be changed for a particular event.

In one or more aspects, the process includes evaluating one or more task solutions to find an optimal task solution. Each task solution is based on one or more constraints. A constraint, as used herein, includes, e.g., a restriction relating to the event or a task to be performed for the event, or a condition to be satisfied for the event or task. If, based on evaluation of the one or more solutions, further task solutions are to be evaluated, then one or more constraints associated with the event are automatically adjusted, e.g., without human intervention, prior to generating other task solutions. The automatic adjusting includes eliminating one or more constraints and/or adjusting one or more priorities associated with one or more constraints. This improves system performance by reducing the use of computer resources to determine the optimal task solution, as defined by one or more criteria.

One embodiment of a computing environment to incorporate and use one or more aspects of the present invention is described with reference to FIG. 1A. As examples, the computing environment may be of various architectures and of various types, including, but not limited to: personal computing, client-server, distributed, virtual, emulated, partitioned, non-partitioned, cloud-based, grid, time-sharing, cluster, peer-to-peer, mobile, having one node or multiple nodes, having one processor or multiple processors, and/or any other type of environment and/or configuration, etc. that is capable of executing a process (or multiple processes) that, e.g., stores data in the selected manner described herein and retrieves and uses that data to generate an optimal task solution for a selected event. Aspects of the present invention are not limited to a particular architecture or environment.

Referring to FIG. 1A, in one example, a computing environment 100 includes, for instance, a computer system 102 shown, e.g., in the form of a general-purpose computing device. Computer system 102 may include, but is not limited to, one or more processors or processing units 104 (e.g., central processing units (CPUs) and/or special-purpose processors, etc.), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of one or more processors 104 via, e.g., one or more buses 111. Further, memory 106 may include one or more programs or applications 116, at least one operating system 118, a solution generator 120 used in one or more aspects of the present invention to generate one or more task solutions for a defined task of a selected event, one or more data structures 121 used in accordance with one or more aspects of the present invention to store data, and one or more computer readable program instructions 122. Computer readable program instructions 122 may be configured to carry out functions of embodiments of aspects of the invention.

In one or more examples, solution generator 120 is or includes an optimizer, and thus, reference to an optimizer is used herein; however, an optimizer is only one example, and other solution generators that are computer-implemented or executable may be used without departing from one or more aspects of the present invention. The solution generator may execute on one or more processors used to perform other processing of one or more aspects of the present invention or may execute one or more other processors that are different from the one or more processors but communica- tively coupled to receive data from the one or more processors and/or provide information to the one or more proces- sors, such as one or more task solutions generated for a defined task of a specified event.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, micro- processor-based systems, set top boxes, programmable con- sumer electronics, network PCs, minicomputer systems, mainframe computer systems, and distributed cloud com- puting environments that include any of the above systems or devices, and the like.

In one or more aspects, to store data and retrieve and use that data, various processing engines are used. For instance, with reference to FIG. 1B, in one example, one or more processors (e.g., one or more of processors 104) includes one or more processing engines, including, for instance: an input feature auxiliary generator 150 to initialize a particular event (e.g., complex scenario or problem) and to initially create default and custom features of one or more data structures used to store data that represent the particular event; a constraint condition classifier 160 to generate one or more constraints corresponding to the features and to con- tinue to maintain the one or more data structures; a restric- tion condition sorter 170 to continue to maintain the one or more data structures and to specify a release order of the constraints for, e.g., a solution generator; and a dynamic feedback controller 180 to provide a result on one or more processing iterations searching for an optimal task solution to the event.

Further details relating to each of the processing engines are described with reference to FIG. 2. In one example, input feature auxiliary generator 150 is used to specify one or more input features associated with the event in which an optimal task solution is to be determined. As examples, one or more input features may include one or more costs 200 and/or one or more custom characteristics 202 associated with the event and/or task to be performed for the event. Since the input features depend on the event, additional, fewer and/or other features may be included without depart- ing from one or more aspects of the present invention.

In one example of a transportation routing event, the input features may include, e.g., transportation costs, labor costs, and/or material handling costs, etc. Again, additional, fewer and/or other costs and/or features may be included for the transportation routing event. The input features provided herein are only one example. Further, other events and/or features may be provided.

Constraint condition classifier 160 includes, in one example, one or more constraints, such as one or more custom constraints 220, one or more recommended genera- tion constraints 222 and one or more constraints of an optimizer or other solution generator. Again, additional, fewer and/or other constraints may be included without departing from one or more aspects of the present invention. The constraints depend, in one or more examples, on the event and/or processing used to determine an optimal task solution, such as a particular optimizer or other solution generator that may be used.

Restriction condition sorter 170 is used to provide an order and/or level of one or more generation release con- straints 240; and dynamic feedback controller 180 may dynamically release one or more constraints 260 and facili- tate dynamic generation and analysis of task solutions to obtain an optimal task solution 262. A task solution is considered optimal herein if it meets one or more criteria that is defined for the specified event. For instance, a task solution selected from a plurality of task solutions may be optimal if it saves the greatest amount of costs compared to the other task solutions; if it may be performed faster than other task solutions; if it uses less resources than other task solutions; if it uses selected resources that other task solutions do not use; and/or based on other selected criteria.

In accordance with an aspect of the present invention, the input features and/or constraints are stored in one or more data structures defined and generated in accordance with one or more aspects of the present invention. Example data structures include a base model data structure and a constraints model data structure, each of which is described in further detail with reference to FIGS. 3-4.

Referring to FIG. 3, one example of a base model data structure (baseModel) defined, generated and used in accordance with one or more aspects of the present invention is described. As an example, a base model data structure 300 includes one or more items, including, but not limited to, one or more features 302 and at least one optimizer item 304. Each feature 302 includes one or more elements 306. Similarly, optimizer item 304 includes one or more elements 308. An element is, for instance, a characteristic, such as, but not limited to, a cost, etc., associated with a task or event. Each element 306, 308 has one or more placeholders 310, 312, respectively, and includes a priority property 314, 316, respectively. Further, each feature 302 and optimizer item 304 includes a layer property 318, 320, respectively.

Moreover, referring to FIG. 4, one example of a constraints model data structure (constraintsModel) defined, generated and used in accordance with one or more aspects of the present invention is described. As an example, a constraints model data structure 400 includes one or more constraints 402. A constraint may also be a combination of constraints. Each constraint 402 may be determined by a formula and each has a layer property 404 and a priority property 406.

One example of a constraint formula is provided below:

Constraint1:(1000<=TranCost.TotalTranCost.
Price<=3000):property:{layer:2,priority:1}

In this example, the feature is Transaction Cost (TranCost), and an element A is TotalTranCost, which means the Total Transaction Cost, and the place holder is Price. Thus, the formula is 1000<=TranCost.TotalTranCost.Price<=3000, in which the price of the total transaction cost in the feature of transaction cost is less than or equal to 3000 and greater than or equal to 1000. Many other constraint formulas are possible and are based on the constraint, task and/or event. The formula provided herein is only one example.

Figure 6:
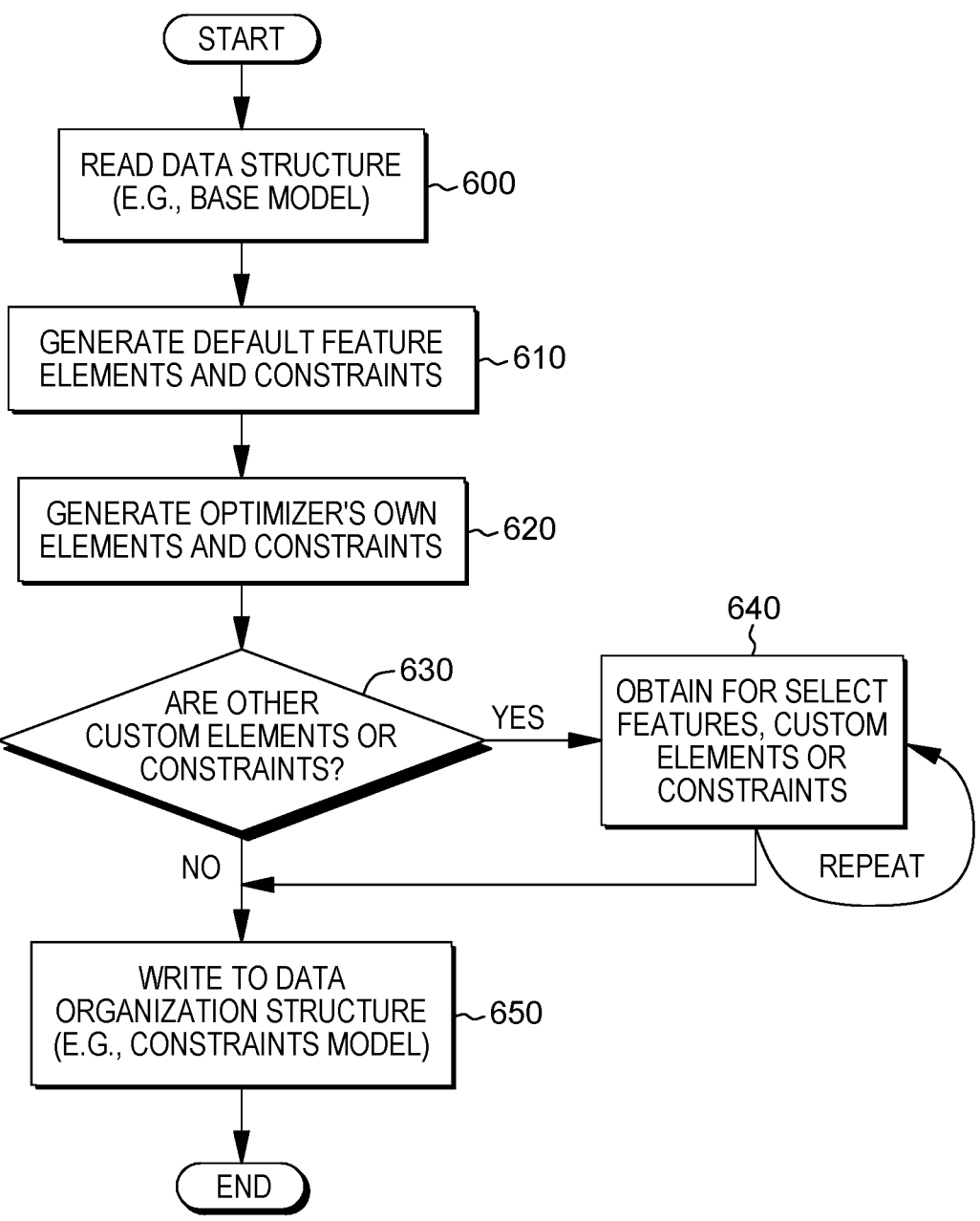
FIG. 6 depicts one example of processing performed by a constraint condition classifier, in accordance with one or more aspects of the present invention.
Figure 7:
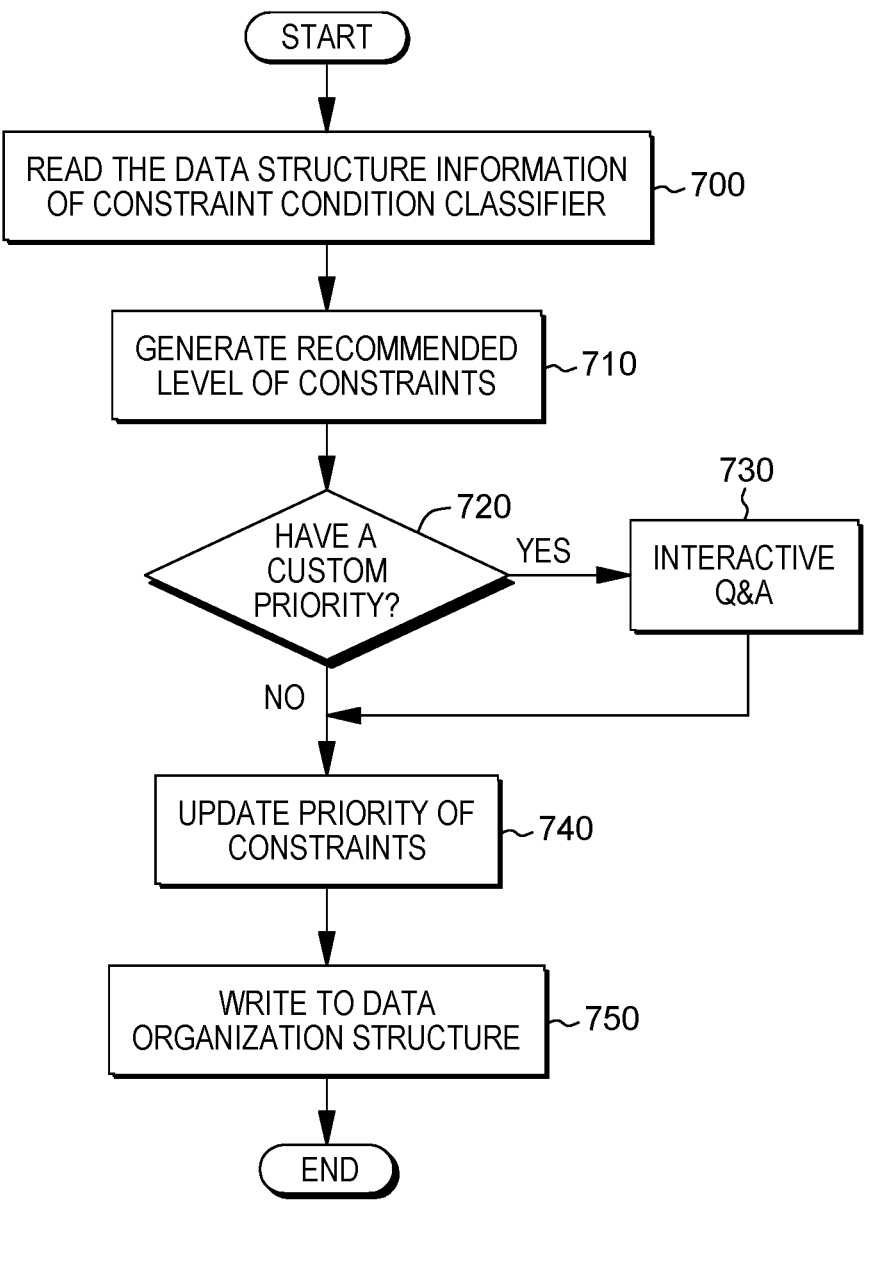
FIG. 7 depicts one example of processing performed by a restriction condition sorter, in accordance with one or more aspects of the present invention.

Base model data structure 300 and constraints model data structure 400 are used to store data, such as features and constraints, used in determining an optimal task solution for an event (e.g., a complex problem). One example of a process to generate the data structures to store the data and use the data to determine an optimal solution is described with reference to FIGS. 5-8. For instance, FIG. 5 describes processing associated with obtaining/generating input data, including input features for a selected event, generating a data structure, such as base model data structure 300, to store the input data, and saving the input data in the data structure; FIG. 6 describes processing associated with obtaining/generating constraint data for the selected event, generating a data structure, such as constraints model data structure 400, to store the constraint data, and saving the constraint data in the data structure; FIG. 7 describes processing associated with providing priority for the constraints included in, e.g., constraints model data structure 400; and FIG. 8 describes processing associated with adjusting one or more constraints to obtain an optimal task solution.

Figure 5:
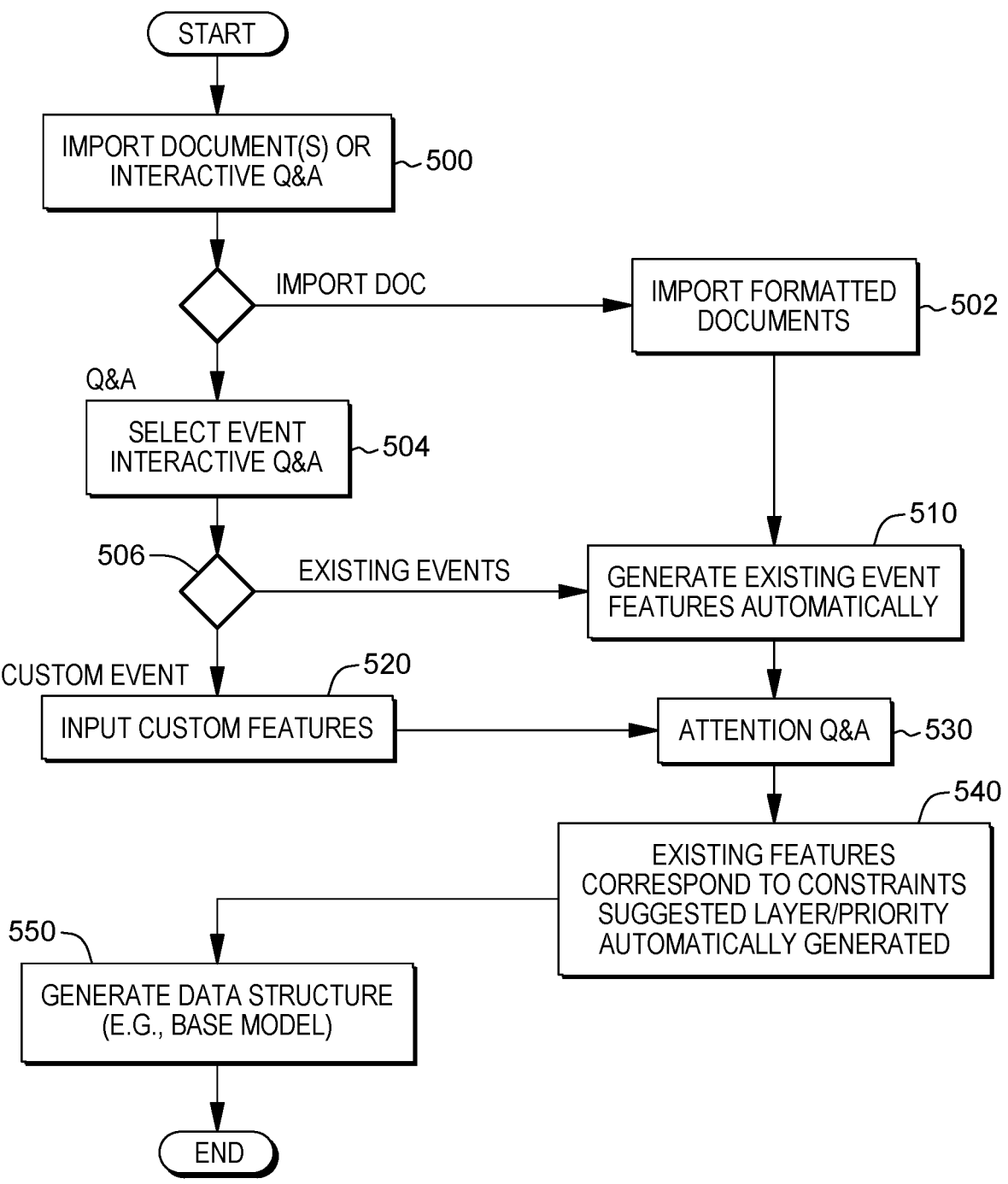
FIG. 5 depicts one example of processing performed by an input feature auxiliary generator, in accordance with one or more aspects of the present invention.

Referring, initially, to FIG. 5, one or more processors (e.g., processor(s) 104) are used to obtain/generate input data, including input features for a selected event, generate a data structure to save the input data, such as base model data structure 300, and save the input data in the data structure. As one example, an input feature auxiliary generator (e.g., input feature auxiliary generator 150) executing on at least one processor is used to obtain/generate input data, generate a data structure to save the input data, and save the input data in the data structure. However, in other embodiments, other components or processing engines of one or more processors may be used; input feature auxiliary generator 150 is only one example.

In one embodiment, input feature auxiliary generator 150 determines 500 whether the user wishes to import one or more documents to define the event (e.g., complex problem) for which a task solution is sought or whether the event is to be defined via one or more question and answer (Q & A) sessions. This may be an inquiry provided to the user, which is answered by the user, or the answer may be automatically determined by whether there are one or more documents being imported or by other means.

In one example, should one or more documents be imported, formatted documents that the user utilizes to define events and custom features in a prescribed format are imported 502 to input feature auxiliary generator 150. In one or more examples, default templates may be established to define an event, such as a routing template for routing within a network, a path planning template for vehicles, a delivery template for services, etc. Otherwise, input feature auxiliary generator 150 provides one or more interactive question and answer sessions 504 used to determine the event for which a task solution is sought.

Based on the interactive question and answer session(s), input feature auxiliary generator 150 determines 506 whether the user is looking for a solution to an existing event. If so or based on the imported documents, input feature auxiliary generator 150 automatically generates 510 one or more input features of the chosen event. For example, for a path planning event, one or more recommended features, such as one or more costs (e.g., transportation costs, labor costs, material costs) may be automatically generated. Additional, fewer and/or other features may be generated for the path planning event and/or other existing events may be selected.

Further, in one embodiment, should input feature auxiliary generator 150 determine that a custom event is being selected, input feature auxiliary generator 150 obtains 520 from the user one or more custom features based on a prescribed custom feature format provided by, e.g., input feature auxiliary generator 150. In one embodiment, custom features may also be input for an existing event. Other variations are also possible.

Based on determining the input features or based on automatically generating existing event features, in one embodiment, input feature auxiliary generator 150 provides 530 another question and answer session, referred to herein as an attention Q&A, which is used to obtain initial layers and/or priorities for one or more of the features. In another embodiment, the initial layers and/or priorities are obtained by using default values or automatically generated based on machine learning related to the events. In one example, input feature auxiliary generator 150 determines 540, e.g., based on attention Q&A 530, whether a feature corresponds to a constraint and automatically generates a layer and/or priority based thereon.

As an example, each feature has a layer, and each element of a feature has a priority. Further, each constraint has a property field, which includes layer and priority properties. Based on, e.g., attention Q&A 530, input feature auxiliary generator 150 initially suggests a layer for the features (e.g., for features corresponding to constraints; all features; selected features, etc.). For example, if there are features material handling cost and other features, during Q&A, and the customer answered that the material handling cost is sorted as the first one of all the features, then the layer of material handling cost will be layer 1 and the remaining will be greater than layer 1, according to this one example rule. Further, for each element of the feature, a priority is suggested based on, e.g., importance of the element determined, e.g. from attentive Q&A 530. Other possibilities and examples are possible.

Input feature auxiliary generator 150 generates 550 a data structure (e.g., base model data structure 300) to store the inputted/imported information, as well as, e.g., the layers/ priorities. The input data is stored in the data structure in the organizational structure defined for the data structure, an example of which is described with reference to FIG. 3.

Based on the input data stored in the data structure, in one embodiment, constraint data is determined and saved in another data structure, such as constraints model data structure 400. One embodiment of this processing is described with reference to FIG. 6. Referring to FIG. 6, one or more processors (e.g., processor(s) 104) are used to obtain/generate constraint data for the selected event, generate a data structure to save the constraint data, such as constraints model data structure 400, and save the constraint data in the data structure. As one example, a constraint condition classifier (e.g., constraint condition classifier 160) executing on at least one processor is used to obtain/generate constraint data for the selected event, generate a data structure to save the constraint data, and save the constraint data in the data structure. However, in other embodiments, other components or processing engines of one or more processors may be used; constraint condition classifier 160 is only one example.

In one embodiment, constraint condition classifier 160 reads 600 the data structure (e.g., base model data structure 300) generated by input feature auxiliary generator 150 and, based on the data saved in the data structure for the selected event, generates 610 one or more feature elements and constraints. For instance, constraint condition classifier 160 includes processing logic through which default events and selected intentions regarding tasks to be performed for the events are converted into elements of default features and recommended constraints for the events.

Further, in one embodiment, a selected optimizer (e.g., an example solution generator 120) is used to generate various solutions to perform the defined task for the selected event and to determine an optimal solution, and therefore, in one example, the optimizer may have its own elements and/or constraints to be included, such as an upper limit of running time, upper and lower bounds of a target range, etc. Thus, in one embodiment, constraint condition classifier 160 generates 620 one or more elements and/or constraints for the optimizer. Example optimizers include, but are not limited to, IBM® Decision Optimization, offered by International Business Machines Corporation, Armonk, NY; Gurobi, offered by Gurobi Optimization, LLC; and IBM® ILOG®

CPLEX® Optimizer, offered by International Business Machines Corporation, Armonk, NY. Although example optimizers are indicated, other optimizers may be used without departing from aspects of the present invention. IBM®, ILOG® and CPLEX® are trademarks or registered trademarks of International Business Machines Corporation in at least one jurisdiction.

Constraint condition classifier 160 determines 630 whether there are additional elements or constraints. This is based, for instance, on an input indicating additional elements or constraints, by a prompt for additional elements or constraints, etc. Should there be one or more additional custom elements or constraints, constraint condition classifier 160 obtains 640 custom elements or constraints for one or more select features. For example, for constraint conditions not generated by the embedded logic, the user can select a corresponding feature and input other feature elements or constraint conditions according to the specified format.

Thereafter, or if there are no additional elements or constraints, constraint condition classifier 160 writes the data to a data organization structure, such as constraints model data structure 400.

Based on the data stored in the data structure, such as constraints model data structure 400, by constraint condition classifier 160, in one embodiment, processing is performed to update that information providing, for instance, level and/or priority information. One embodiment of this processing is described with reference to FIG. 7. Referring to FIG. 7, one or more processors (e.g., processor(s) 104) are used to update the data. As one example, a restriction condition sorter (e.g., restriction condition sorter 170) executing on at least one processor is used update that information providing, for instance, level and/or priority information. However, in other embodiments, other components or processing engines of one or more processors may be used; restriction condition sorter 170 is only one example.

Referring to FIG. 7, in one embodiment, restriction condition sorter 170 reads 700 the data stored in the data structure, e.g., constraints model data structure 400, by constraint condition classifier 160, and automatically generates 710 recommended levels of the constraints. For instance, there may be multiple levels of constraints and based on obtained data (e.g., from constraints model data structure 400, other data, etc.) or learned processing, restriction condition sorter 170 generates recommended levels of constraints (e.g., level 1, level 2, etc.). In other embodiments, there is only one level and the constraints are on the same level. Other variations are also possible. As an example, the recommended levels of the constraints can be automatically generated based on layers of the features in the constraints and/or priorities of the elements in the constraints. For instance, for a higher layer (i.e., a layer with a higher number) for a feature in the constraints, the higher the level number for the constraints. Next, the higher a priority number for an element in the constraints, the higher the level number for the constraints. Any chosen technique may be used to automatically determine level based on layer number and/or priority number. For instance, a constraint may be assigned a same level number as a layer number; assigned a level number based on the greater of a layer number and a priority number; any constraint having a layer of x is assigned a level y; any constraint with an element of priority z is assigned level w; etc. Many techniques are possible. In one example, the higher the level number, the lower the priority for the constraint (e.g., a level of 2 has a lower priority than a level of 1, in one example). It is also acceptable to adjust the level for the constraints manually. Other variations are also possible.

Further, in one embodiment, restriction condition sorter 170 determines 720 whether there is a custom priority. For instance, restriction condition sorter 170 determines whether the user, based on the user's understanding of the event, has a suggested priority for one or more constraints. In one example, the determination of whether there are one or more custom priorities to be applied is based on a received indication by restriction condition sorter 170 of such custom priorities or by an interaction question and answer session with the user. Should there be one or more custom priorities, those priorities may be obtained by, e.g., an interaction question and answer session 730; by input by the user; and/or by other mechanisms.

Based on obtaining one or more custom priorities or if there are no custom priorities, restriction condition sorter 170 updates 740 the priorities of the constraints. For instance, based on whether there is a specified priority from the user and the recommended priorities, the priorities of the constraints are updated. In one example, restriction condition sorter 170 may update the recommended level of constraints based on the updated priorities. Restriction condition sorter 170 saves 750, at least, the priority information in the data structure, e.g., constraints model data structure 400.

Figure 8:
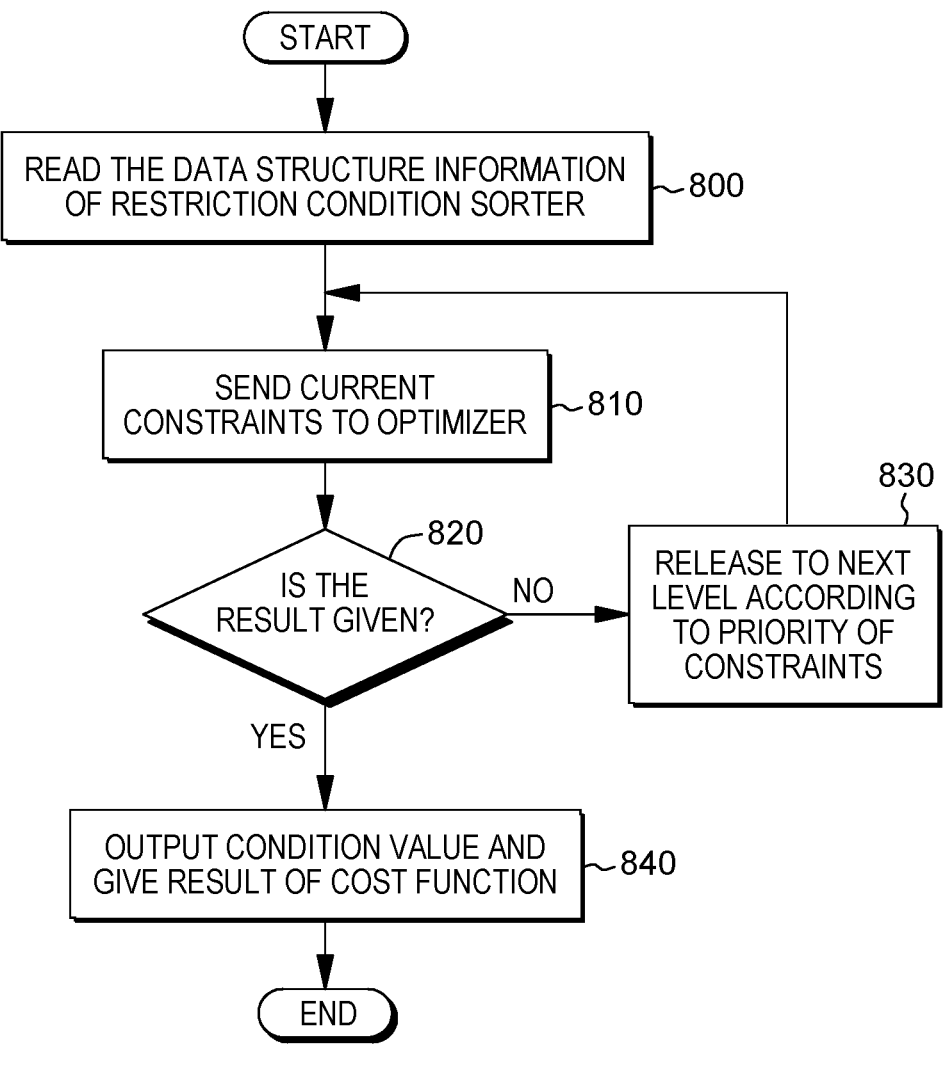
FIG. 8 depicts one example of processing performed by a dynamic feedback controller, in accordance with one or more aspects of the present invention.

Based on the data stored in the data structure, such as constraints model data structure 400, by restriction condition sorter 170, in one embodiment, processing is performed to facilitate generation of one or more solutions to the specified event. One embodiment of this processing is described with reference to FIG. 8. Referring to FIG. 8, one or more processors (e.g., processor(s) 104) are used to perform processing to facilitate generation of one or more solutions. As one example, a dynamic feedback controller (e.g., dynamic feedback controller 180) executing on at least one processor is used to perform processing to facilitate generation of one or more solutions. However, in other embodiments, other components or processing engines of one or more processors may be used; dynamic feedback controller 180 is only one example.

Referring to FIG. 8, in one embodiment, dynamic feedback controller 180 reads 800 the data structure information provided by restriction condition sorter 170, such as the updated data in constraints model data structure 400. Dynamic feedback controller 180 sends 810 the current constraints to a solution generator, such as solution generator 120. One example of a solution generator is a selected optimizer. The selected optimizer receives the data and generates one or more solutions (e.g., task solutions). Dynamic feedback controller 180 obtains the one or more task solutions and determines 820 whether a satisfactory result (e.g., an optimal solution) has been generated. This determination is based on defined criteria, such as does one of the task solutions meet a certain threshold; run within a certain time period; or use a certain number of resources; etc. If a result is not found, i.e., no task solution is considered satisfactory (e.g., optimal) since it does not meet the defined criteria, dynamic feedback controller 180 automatically adjusts the set of constraints. For instance, it automatically releases 830 one or more constraints based on priority. As an example, a constraint with a highest level number with respect to other constraints has the lowest priority and therefore is selected to be released; any constraints having a level greater than a predefined number is selected for release; any constraints having a priority lower than a selected priority is chosen for release; etc. Dynamic feedback controller 180 sends 810 the updated information to the optimizer to generate one or more other task solutions. Processing continues with inquiry 820. If, however, a satisfactory task solution is obtained in that one of the solutions meets the defined criteria, then dynamic feedback controller 180 outputs 840 an indication of the optimal solution, such as a condition value (e.g., constraints of the final result), and provides a result of the associated cost function. For instance, the user is informed of the task solution to be used to perform the task(s) for the selected event.

Described above is one example of a process used to obtain an optimal task solution to be used to perform one or more tasks of a selected event. One or more aspects of the process may use machine learning. For instance, machine learning may be used to determine how to set priorities of constraints; change one or more priorities; determine layers and/or levels; determine which constraints should be released; and/or perform other tasks of the process. A system is trained to perform analyses and learn from input data and/or choices made.

Figure 9:
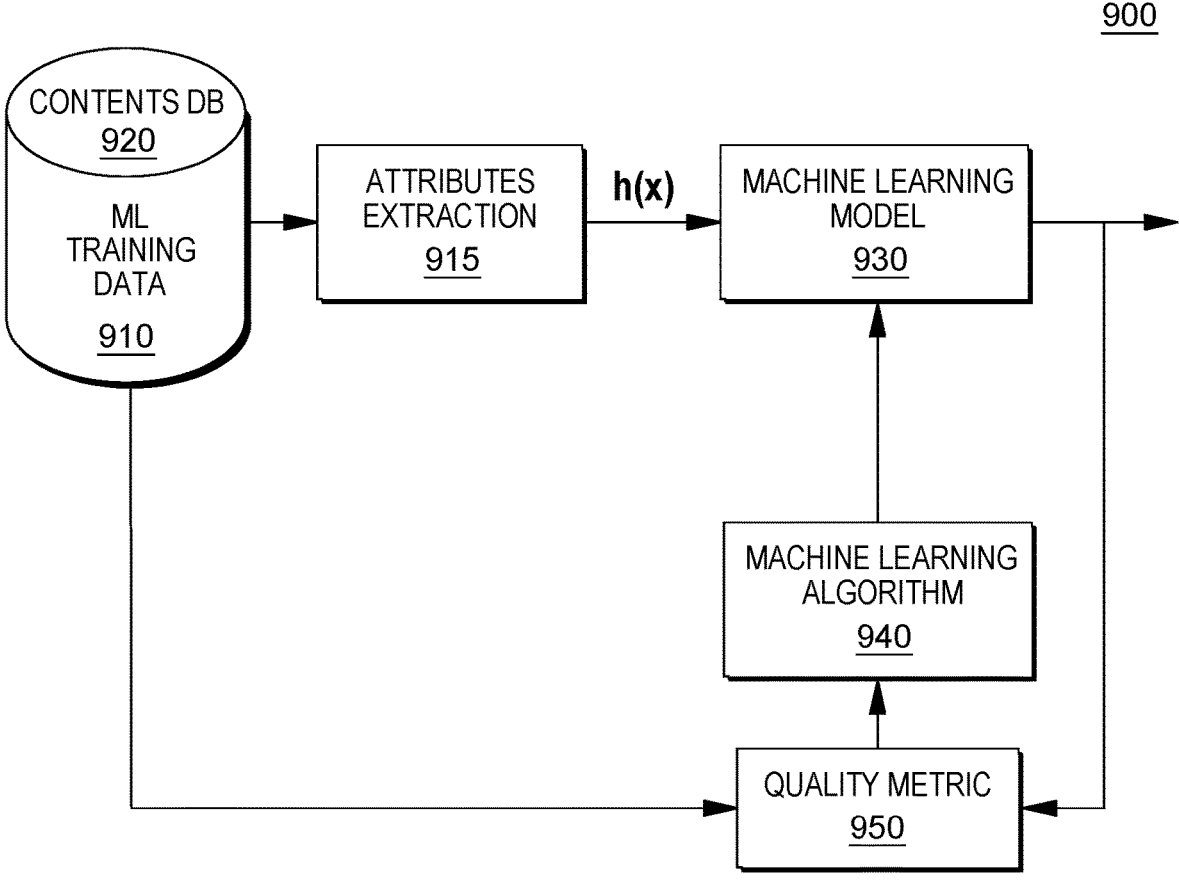
FIG. 9 depicts one example of a machine learning training system used in accordance with one or more aspects of the present invention.

FIG. 9 is one example of a machine learning training system 900 that may be utilized, in one or more aspects, to perform cognitive analyses of various inputs, including data from one or more data structures, such as base model data structure 300 and/or constraints model data structure 400, and/or other data. Training data utilized to train the model in one or more embodiments of the present invention includes, for instance, data that pertains to one or more events, such as data used to populate the data structures, etc. The program code in embodiments of the present invention performs a cognitive analysis to generate one or more training data structures, including algorithms utilized by the program code to predict states of a given event. Machine learning (ML) solves problems that are not solved with numerical means alone. In this ML-based example, program code extracts various attributes from ML training data 910 (e.g., historical data collected from various data sources relevant to the event), which may be resident in one or more databases 920 comprising event or task-related data and general data. Attributes 915 are utilized to develop a predictor function, h(x), also referred to as a hypothesis, which the program code utilizes as a machine learning model 930.

In identifying various event states, features, constraints and/or behaviors indicative of states in the ML training data 910, the program code can utilize various techniques to identify attributes in an embodiment of the present invention. Embodiments of the present invention utilize varying techniques to select attributes (elements, patterns, features, constraints, etc.), including but not limited to, diffusion mapping, principal component analysis, recursive feature elimination (a brute force approach to selecting attributes), and/or a Random Forest, to select the attributes related to various events. The program code may utilize a machine learning algorithm 940 to train the machine learning model 930 (e.g., the algorithms utilized by the program code), including providing weights for the conclusions, so that the program code can train the predictor functions that comprise the machine learning model 930. The conclusions may be evaluated by a quality metric 950. By selecting a diverse set of ML training data 910, the program code trains the machine learning model 930 to identify and weight various attributes (e.g., features, patterns, constraints) that correlate to various states of an event.

The model generated by the program code is self-learning as the program code updates the model based on active event feedback, as well as from the feedback received from data related to the event. For example, when the program code determines that there is a constraint that was not previously predicted by the model, the program code utilizes a learning agent to update the model to reflect the state of the event, in order to improve predictions in the future. Additionally, when the program code determines that a prediction is incorrect, either based on receiving user feedback through an interface or based on monitoring related to the event, the program code updates the model to reflect the inaccuracy of the prediction for the given period of time. Program code comprising a learning agent cognitively analyzes the data deviating from the modeled expectations and adjusts the model to increase the accuracy of the model, moving forward.

In one or more embodiments, program code, executing on one or more processors, utilizes an existing cognitive analysis tool or agent to tune the model, based on data obtained from one or more data sources. One or more embodiments utilize, for instance, an IBM Watson® system as the cognitive agent. In one or more embodiments, the program code interfaces with IBM Watson Application Programming Interfaces (APIs) to perform a cognitive analysis of obtained data. Specifically, in one or more embodiments, certain of the APIs of the IBM Watson API comprise a cognitive agent (e.g., learning agent) that includes one or more programs, including, but not limited to, natural language classifiers, Retrieve and Rank (i.e., a service available through the IBM Watson Developer Cloud™ that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank APIs, and trade off analytics APIs. The IBM Watson Application Program Interface (API) can also provide audio related API services, in the event that the collected data includes audio, which can be utilized by the program code, including but not limited to natural language processing, text to speech capabilities, and/or translation. IBM Watson® and IBM Watson Developer Cloud™ are registered trademarks or trademarks of International Business Machines Corporation in at least one jurisdiction.

In one or more embodiments, the program code utilizes a neural network to analyze event-related data to generate the model utilized to predict the state of a given event at a given time. Neural networks are a biologically-inspired programming paradigm which enable a computer to learn and solve artificial intelligence problems. This learning is referred to as deep learning, which is a subset of machine learning, an aspect of artificial intelligence, and includes a set of techniques for learning in neural networks. Neural networks, including modular neural networks, are capable of pattern recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns in data (i.e., neural networks are non-linear statistical data modeling or decision making tools). In general, program code utilizing neural networks can model complex relationships between inputs and outputs and identify patterns in data. Because of the speed and efficiency of neural networks, especially when parsing multiple complex data sets, neural networks and deep learning provide solutions to many problems in multiple source processing, which the program code in one or more embodiments accomplishes when obtaining data and generating a model for predicting states of a given event.

One or more aspects, including identifying constraints or features for a particular event and/or identifying constraints that may be released to determine an optimal solution for an event, may utilize artificial intelligence, and in particular, machine learning in the decision-making process. A model is trained to be able to perform certain tasks, such as, but not limited to, identify the features and/or constraints of a particular event and/or constraints to be released. This model is then used in one or more aspects. For instance, it is used by, e.g., dynamic feedback controller 180, to inform the solution generator of which constraint(s) to be released (or adjusted) and/or to recommend constraints and/or features to be included in base model data structure 300 and/or constraints model data structure 400. Other aspects may also be performed by artificial intelligence (e.g., machine learning) to, e.g., recommend the order for the constraints in an optimization problem.

As described herein, in one or more aspects, a process (e.g., a common process) is defined that provides optimal solutions for selected events, such as real-world events. One example event in which one or more aspects of the present invention is used is described below. In this example, the selected event is a vehicle traveling from one destination to another destination and the defined task is routing for the vehicle. However, as indicated herein, this is only one example. The process can be used to determine optimal task solutions for many events, which are under the use of optimizers.

In one particular example, a series of pre-made interactive questions and answers is provided to confirm the user's default event, produce a series of default features according to the default event selected by the user and obtain a base model data structure (e.g., base model data structure 300) generated by an input generator, such as input feature auxiliary generator 150. Example questions and answers include:

Which one of the following events do you expect to use?
[1] Vehicles Traveling
[2] Express Delivery Transportation
[3] Custom Event
. . . .

According to the [1] Vehicles Traveling event selected, the following default features have been automatically generated, in one example:
Transportation cost
Labor cost
    Maximum transport site
. . . .

Does it have other custom features? (Yes/No) Answer: Yes

Please enter custom features in sequence, in the following format:
Custom feature1 (Answer: Material Handling Costs)
Custom feature2
    delete feature3 (Answer: Maximum Transport Site)
. . . .

The features currently indicated include:
Transportation cost
Labor cost
Material handling cost
. . . .

Please sort the above features according to priority, indicated by property below (unsorted features default to the lowest priority). The format is as follows, in one example:

(1) Feature1 (Answer: Material handling cost is highest priority)

(2) Feature2

. . . .

At present, all features and properties are sorted as follows:

(1) Material handling cost (2) Transportation cost (3) Labor cost

. . . .

According to the interactive Q&A, the following base model data structure (e.g., base model data structure 300) can be generated:

```
baseModel:{
Material handling cost:{ }: property:{layer:1}
Transportation cost:{ }: property:{layer:2}
Labor cost:{ }: property:[layer:2}
Optimizer:{}: property:{layer:1}
....
}
```

If a user chooses to use custom format documents, after the user imports the document, the system (e.g., input feature auxiliary generator 150) automatically recognizes the event, custom features, etc., and generates a default data structure.

After input feature auxiliary generator 150 generates the data structure (e.g., base model data structure 300), constraint condition classifier 160 parses base model data structure 300, updates a series of default elements in the base model according to the default features of the default event and user attention, and generates corresponding constraints model data structure (e.g., constraints model data structure 400) feature constraints and optimizer constraints. The new base model and constraints model data structures are, for instance:

After constraint condition classifier 160 generates the default data structure (e.g., constraints model data structure 400), it confirms with the user through, e.g., interactive Q&A. At this time, the user can continue to add custom feature elements or constraints. After the process is completed, the base model and constraints model data structures of the final constraint condition classifier 160 are generated.

Based on the existing features, the system (e.g., constraint condition classifier 160) automatically generates the following feature elements:

Material Handling Costs:

TranCost:TotalTranCost.Price

LaborCost: SeniorLaborCost.Price, SeniorLabor-Cost.HC, AdvisoryLaborCost.Price, AdvisoryLabor-Cost.HC, JuniorLaborCost.Price, JuniorLaborCost.HC Optimizer: CalculationTime.Time

. . . .

Do you have other custom features? (Yes/No)

Assuming the answer is Yes:

Please enter your custom feature elements in the following format:

FeatureName: ElementName.PlaceholderName replace FeatureName: ElementName.Placeholder-Name==value del FeatureName: ElementName.PlaceholderName

. . . .

For example, the following features are added:

MaterialHandlingCost:TotalMaterialHandlingCost.Price

LaborCost: SeniorLaborCost.Price==50

LaborCost: AdvisoryLaborCost.Price==30

LaborCost: JuniorLaborCost.Price==10

There are currently the following feature elements, in one example:

MaterialHandlingCost: TotalMaterialHandlingCost.Price

TranCost:TotalTranCost.Price

LaborCost: SeniorLaborCost.Price-50, SeniorLabor-Cost.HC, AdvisoryLaborCost.Price-30, AdvisoryLabor-Cost.HC, JuniorLaborCost.Price-10, JuniorLaborCost.HC Optimizer: CalculationTime.Time

. . . .

```
baseModel:{
Material handling cost:{ }: property:{layer:1};
Transportation cost:{ }: property:{layer:2};
Labor cost:{ }: property:{layer:2};
Optimizer:{}: property:{layer:1};
....
}
↓
baseModel:{
Material handling cost :{ }: property:{layer:1}
Transportation cost :{Total transportation cost(Price):property:{priority:1}}:
property:{layer:2}
Labor cost :{SeniorLaborCost(Price, HC):property:{priority:1}, AdvisoryLaborCost
(Price, HC):property:{priority:2}, JuniorLaborCost(Price, HC):property:
{priority:3}}: property:{layer:2}
Optimizer:{CalculationTime(Time):property:{priority:1}}: property:{layer:1}
....
}
constraintsModel:{
constraint1 : (1000 <= TranCost.TotalTranCost.Price <= 3000):property:
{layer:2,priority:1)}
constraint2 : (Labor cost.SeniorLaborCost.HC) +
Labor.Cost.AdvisoryLaborCost.HC + Labor.Cost.JuniorLaborCost.HC > 0):
property:{layer:2, priority:1}
constraint3 : (100 <= Optimizer.CalculationTime.Time <= 300):property:
{layer:1,priority:1}
constraint4: (5000 < MaterialHandlingCost:TotalMaterialHandlingCost.Price <=
1000):property:{layer:1,priority:1}
....
}
```

After constraint condition classifier 160 generates the default data structure, it confirms with the user through interactive Q&A. At this time, the user can continue to add custom feature elements or constraints. After the process is completed, the baseModel and constraintsModel data structures are generated.

After constraint condition classifier 160 generates the data structure, restriction condition sorter 170 parses the base model and constraints model data structures and sorts the priority of the constraints according to the built-in algorithm (e.g., sorting technique, such as, e.g., selection sort, quick sort, etc.) to obtain the new base model and constraints model data structures.

```
baseModel:{
MaterialHandlingCost :{TotalMaterialHandlingCost(Price):property:{priority:1}}:
property:{layer:1}
TranCost :{TotalTranCost(Price):property:{priority:1}}:property:{layer:2}
LaborCost:{SeniorLaborCost(Price==50, HC):property:{priority:1},
AdvisoryLaborCost(Price ==30, HC):property:{priority:2}, JuniorLaborCost(Price
==10, HC):property:{priority:3}}: property:{layer:2}
Optimizer :{CalculationTime(Time):property:{priority:1}}: property:{layer:1}
......
}
constraintsModel:{
constraint1 : (500 <= TranCost.TotalTranCost.Price <=
1000):property:{layer:2,priority:1}
constraint2 : (LaborCost.SeniorLaborCost.HC + LaborCost.AdvisoryLaborCost.HC
+ LaborCost.JuniorLaborCost.HC > 0):property:{layer:2,priority:1}
constraint3 : (100 <= Optimizer.CalculationTime.Time <=
300):property:{layer:1,priority:1}
constraint4 : (500 < MaterialHandlingCost:TotalMaterialHandlingCost.Price <=
1000):property:{layer:1,priority:1}
constraint5 : (LaborCost.SeniorLaborCost.Price * LaborCost.SeniorLaborCost.HC +
LaborCost.AdvisoryLaborCost.Price * LaborCost.AdvisoryLaborCost.HC +
LaborCost. JuniorLaborCost.Price * LaborCost.JuniorLaborCost.HC < 500)
:property:{layer:2,priority:1}
......
}
```

According to the existing features, the system (e.g., constraint condition classifier 160) automatically generates the following constraints:

Constraint 1: $1000 \leq \text{TranCost.TotalTranCost.Price} \leq 3000$

Constraint 2: LaborCost. SeniorLaborCost.HC+LaborCost.AdvisoryLaborCost.HC+LaborCost.JuniorLaborCost.HC>0

Constraint 3: $100 \leq \text{Optimizer.CalculationTime.Time} \leq 300$

Do you have other custom constraints? (Yes/No)

Assuming the answer is Yes:

Please enter your custom constraints in the following format, in one example:

FeatureName.ElementName.Placeholder>=FeatureName.ElementName.Placeholder

Minimum<=FeatureName.ElementName.Placeholder<=Maximum del constraint 1 update constraint 1: Minimum<=FeatureName.ElementName.Placeholder<=Maximum

Thus:

$500<\text{MaterialHandlingCost:TotalMaterialHandlingCost.Price}\leq1000$.

LaborCost.SeniorLaborCost.Price*LaborCost.SeniorLaborCost.HC+LaborCost.

AdvisoryLaborCost.Price*LaborCost.AdvisoryLaborCost.HC+LaborCost.

JuniorLaborCost.Price*LaborCost.JuniorLaborCost.HC<500 update constraint 1: $3000 \leq \text{TranCost.TotalTranCost.Price} \leq 5000$

According to the interactive Q&A, constraint condition classifier 160 updates the base model and constraints model data structures.

After restriction condition sorter 170 generates the default data structure, it confirms with the user through interactive Q&A. At this time, the user can prioritize the constraints. After the process is completed, the base model and constraints model data structures of the final restriction condition sorter will be generated.

The current constraints and priorities are as follows, in one example:

constraint1: (500<=TranCost.TotalTranCost.Price<=1000):property:{layer:2,priority: 1} constraint2: (LaborCost.SeniorLaborCost.HC+LaborCost.AdvisoryLaborCost.HC+LaborCost.JuniorLaborCost.HC>0): property: {layer:2,priority:1} constraint3: (100<=Optimizer.CalculationTime.Time<=300):property:{layer:1,priority:1} constraint4: (500<MaterialHandlingCost:TotalMaterialHandlingCost.Price<=1000):property: {layer:1,priority:1} constraint5: (LaborCost. SeniorLaborCost.Price* LaborCost. SeniorLaborCost.HC+LaborCost.AdvisoryLaborCost.Price*LaborCost. AdvisoryLaborCost.HC+LaborCost.JuniorLaborCost.Price*LaborCost.JuniorLaborCost.HC<500):property:{layer:2,priority:1}

. . .

Would you like to adjust the priority of the constraints? (Yes/No)

Assuming the answer is Yes:

Please adjust the priority of the constraint condition according to the following format (the priority is not adjusted if there is no condition)

constraint 1: property: {layer:XX,priority:YY}

In one example, the priorities are adjusted as follows:

constraint1: property: {layer:3,priority:1} constraint5: property: {layer:2,priority:2}

According to the interactive Q&A, restriction condition sorter 170 updates base model and constraints model data structures, as follows, in one example:

```
baseModel:{
Optimizer :{CalculationTime(Time):property:{priority:1}}: property:{layer:1}
MaterialHandlingCost :{TotalMaterialHandlingCost(Price):property:{priority:1}}:
property:{layer:1}
TransportationCost :{TotalTranCost(Price):property:{priority:1}}:property:{layer:2}
LaborCost:{SeniorLaborCost(Price==50, HC):property:{priority:1},
AdvisoryLaborCost(Price==30, HC):property:{priority:2},
JuniorLaborCost(Price==10, HC):property:{priority:3}}: property:{layer:2}
......
}
constraintsModel:{
constraint3 : (100 <= Optimizer.CalculationTime.Time <=
300):property:{layer:1,priority:1}
constraint4 : (500 < MaterialHandlingCost:TotalMaterialHandlingCost.Price <=
1000):property:{layer:1,priority:1}
constraint2 : (LaborCost.SeniorLaborCost.HC + LaborCost.AdvisoryLaborCost.HC
+ LaborCost.JuniorLaborCost.HC > 0):property:{layer:2,priority:1}
constraint5 : (LaborCost.SeniorLaborCost.Price * LaborCost. SeniorLaborCost.HC
+ LaborCost.AdvisoryLaborCost.Price * LaborCost.AdvisoryLaborCost.HC+
LaborCost.JuniorLaborCost.Price * LaborCost.JuniorLaborCost.HC < 500):
property:{layer:2,priority:2}
constraint1 : (500 <= TranCost.TotalTranCost.Price <= 1000):property:
{layer:3,priority:1}
......
}
```

After restriction condition sorter 170 generates the final base model and constraints model data structures, dynamic feedback controller 180 reads the constraints model data structure and starts the model construction and optimization solution process. The constraints are sent into the model for a task solution. If the optimal task solution cannot be obtained, the low priority constraints are removed (e.g., automatically, without user intervention, by, e.g., dynamic feedback controller 180) in turn according to the priority of the constraints, and solved again, until the optimal task solution is finally obtained, the condition value (e.g., constraints of the final result) is output and the result of cost function is given.

One example of an optimization solution process is as follows:

constraint3:          (100<=Optimizer.CalculationTime.
   Time<=300):property: {layer: 1,priority:1} constraint4:   (500<MaterialHandlingCost:TotalMaterial-
   HandlingCost.Price<=1000):property: {layer: 1,prior-
   ity:1} constraint2:   (LaborCost.  SeniorLaborCost.HC+Labor-
   Cost.AdvisoryLaborCost.HC+LaborCost.JuniorLabor-
   Cost.HC>0): property: {layer:2,priority:1} constraint5:  (LaborCost.  SeniorLaborCost.Price*Labor-
   Cost.      SeniorLaborCost.HC+LaborCost.Advisory-
   LaborCost.Price*LaborCost. AdvisoryLaborCost.HC+
   LaborCost.JuniorLaborCost.Price*LaborCost.Junior-
   LaborCost.HC<500):property: {layer:2,priority:2} constraint1:      (500<=TranCost.TotalTranCost.Price<=
   1000):property: {layer:3,priority: 1}

This provides a task solution of:

```
{
Optimizer.CalculationTime.Time == 277;
MaterialHandlingCost:TotalMaterialHandlingCost.Price == 699;
LaborCost.SeniorLaborCost.HC == 1;
LaborCost.AdvisoryLaborCost.HC == 2;
LaborCost.JuniorLaborCost.HC == 3;
TranCost.TotalTranCost.Price == 876
... ...
}
```

If, for instance, cannot get an acceptable result within time period of optimizer, then:

constraint3:          (100<=Optimizer.CalculationTime.
   Time<=300):property: {layer:1,priority:1} constraint4:   (500<MaterialHandlingCost:TotalMaterial-
   HandlingCost.Price<=1000):property: {layer: 1,prior-
   ity:1} constraint2:   (LaborCost.  SeniorLaborCost.HC+Labor-
   Cost.AdvisoryLaborCost.HC 1000):property: {layer:1,
   priority:1}+LaborCost.JuniorLaborCost.HC>0): prop-
   erty: {layer:2,priority:1} constraint5:  (LaborCost.  SeniorLaborCost.Price*Labor-
   Cost.  SeniorLaborCost.HC+LaborCost.  Advisory-
   LaborCost.Price*LaborCost. AdvisoryLaborCost.HC+
   LaborCost.JuniorLaborCost.Price*LaborCost.Junior-
   LaborCost.HC<500):property: {layer:2,priority:2}

As seen above, constraint 1 is automatically deleted and a task solution of the following is provided, in one example:

```
{
Optimizer.CalculationTime.Time == 257;
MaterialHandlingCost:TotalMaterialHandlingCost.Price == 899;
LaborCost.SeniorLaborCost.HC == 2;
LaborCost.AdvisoryLaborCost.HC == 4;
LaborCost.JuniorLaborCost. HC == 9;
TranCost.TotalTranCost.Price == 1876
... ...
}
```

If, in one example, cannot get an acceptable result within time period of optimizer, then:

constraint3:   (100<=Optimizer.CalculationTime.Time<=
   300):property: {layer:1,priority:1} constraint4:   (500<MaterialHandlingCost:TotalMaterial-
   HandlingCost.Price<=1000):property: {layer: 1,prior-
   ity:1} constraint2:   (LaborCost.  SeniorLaborCost.HC+Labor-
   Cost.AdvisoryLaborCost.HC+LaborCost.JuniorLabor-
   Cost.HC>0): property: {layer:2,priority:1}

In this example, constraint 5 is also automatically deleted and the following task solution is provided, in one example:

```
{
   Optimizer.CalculationTime.Time == 227;
   MaterialHandlingCost:TotalMaterialHandlingCost.Price == 937;
   LaborCost.SeniorLaborCost.HC == 5;
   LaborCost.AdvisoryLaborCost.HC == 11;
   LaborCost.JuniorLaborCost.HC == 21;
   TranCost.TotalTranCost.Price == 2876
   ... ...
}
```

The above solution is considered the optimal task solution since it meets the defined criteria of meeting the remaining criteria and being able to be obtained within a selected time frame. Variations are possible.

As described above, a process (e.g., a common process usable for many scenarios or events in which an optimizer is employed) is provided that determines an optimal solution for a selected event, as indicated by defined criteria, to perform one or more tasks for the selected event. In one or more aspects, the process provides dynamic analysis and release of constraints, thereby reducing manual intervention and determining an optimal solution quickly. The process may be included as a plug-in for an optimizer and/or a tool used by an optimizer, as examples.

One or more aspects of the present invention are tied to computer technology and facilitate processing within a computer, improving performance thereof. By having a process that stores data in a certain format, retrieves that data and uses it to obtain a task solution saves on resources and processing time, improving performance. Further, by having a process that automatically adjusts constraints and re-generates solutions, efficiencies in processing are provided, saving system resources and improving performance. This improves processing within a processor, computer system and/or computing environment.

Further details of one embodiment of facilitating processing within a computing environment, as it relates to one or more aspects of the present invention, are described with reference to FIGS. 10A-10C.

Referring to FIG. 10A, in one embodiment, a controller executing on one or more processors of a computing environment obtains 1000 data stored in one or more data structures generated based on a defined task to be performed for a selected event. In one example, the data 1002 includes a set of constraints for the defined task to be performed for the selected event. The data is provided 1004 to a solution generator to be executed on at least one processor. The solution generator is to be used 1006 to obtain a task solution to specify how to perform the defined task for the selected event. The task solution is to satisfy 1008 one or more defined criteria.

Further, in one example, one or more task solutions generated by the solution generator are obtained 1010 for the defined task, in which the one or more task solutions are generated using the data that is provided. A determination is made 1012 as to whether the one or more task solutions include the task solution that satisfies the one or more defined criteria. Based on determining that the one or more task solutions do not include the task solution that satisfies the one or more defined criteria, the set of constraints is automatically adjusted 1014 to provide an adjusted set of constraints. The adjusted set of constraints is to be automatically provided 1016 to the solution generator to be used to obtain the task solution to specify how to perform the defined task.

In one example, the task solution to specify how to perform the defined task for the selected event is obtained 1018, and at least an indication of the task solution to perform the defined task for the selected event is outputted 1020.

By storing the data in a selected form and retrieving and using that data, use of computer resources is reduced, and system performance is improved. Further, the automatically adjusting enables task solutions to be generated that otherwise could not be generated. Use of computer resources is reduced and performance is improved. Reducing the use of computer resources and/or improving system performance provides benefits to various technologies that use data stored in the selected form.

In one embodiment, referring to FIG. 10B, the providing, the obtaining, the determining, and the automatically adjusting are iteratively performed 1030 one or more times to obtain the task solution that satisfies the one or more defined criteria. In one example, the data 1032 includes the adjusted set of constraints.

As an example, a data structure of the one or more data structures includes one or more features and one or more indicated priorities for the one or more features 1040, and in one example, at least a portion of the one or more features is specific to the selected event 1042. The one or more features include, for instance, at least one default feature, at least one custom feature, and at least one feature specific to the solution generator 1044.

By storing the data in a selected form, use of computer resources is reduced, and system performance is improved.

In one example, another data structure of the one or more data structures includes a constraints data structure that includes the set of constraints for the selected event 1050. The set of constraints include one or more constraints for at least one feature of the one or more features and one or more respective priorities for the one or more constraints 1052.

By storing the data in a selected form, use of computer resources is reduced, and system performance is improved.

As an example, the automatically adjusting the set of constraints includes automatically removing 1060 one of the constraints from the set of constraints. The automatically removing one of the constraints from the set of constraints is based on priority of constraints in the set of constraints 1062. As another example, the automatically adjusting the set of constraints includes automatically adjusting 1064 one or more respective priorities of one or more constraints of the set of constraints.

The automatically adjusting improves efficiency in determining a task solution and improves computer processing by, for instance, reducing the use of computer resources, improving system performance.

In one embodiment, referring to FIG. 10C, a generator executing on at least one processor of the one or more processors generates 1070 the one or more data structures based on information obtained by the generator using one or more templates created for the defined task of the selected event.

As an example, a defined task includes routing, and the selected event includes an event in which routing is performed 1072. Other example defined tasks and/or selected events are possible.

Again, other aspects, variations and/or embodiments are possible.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
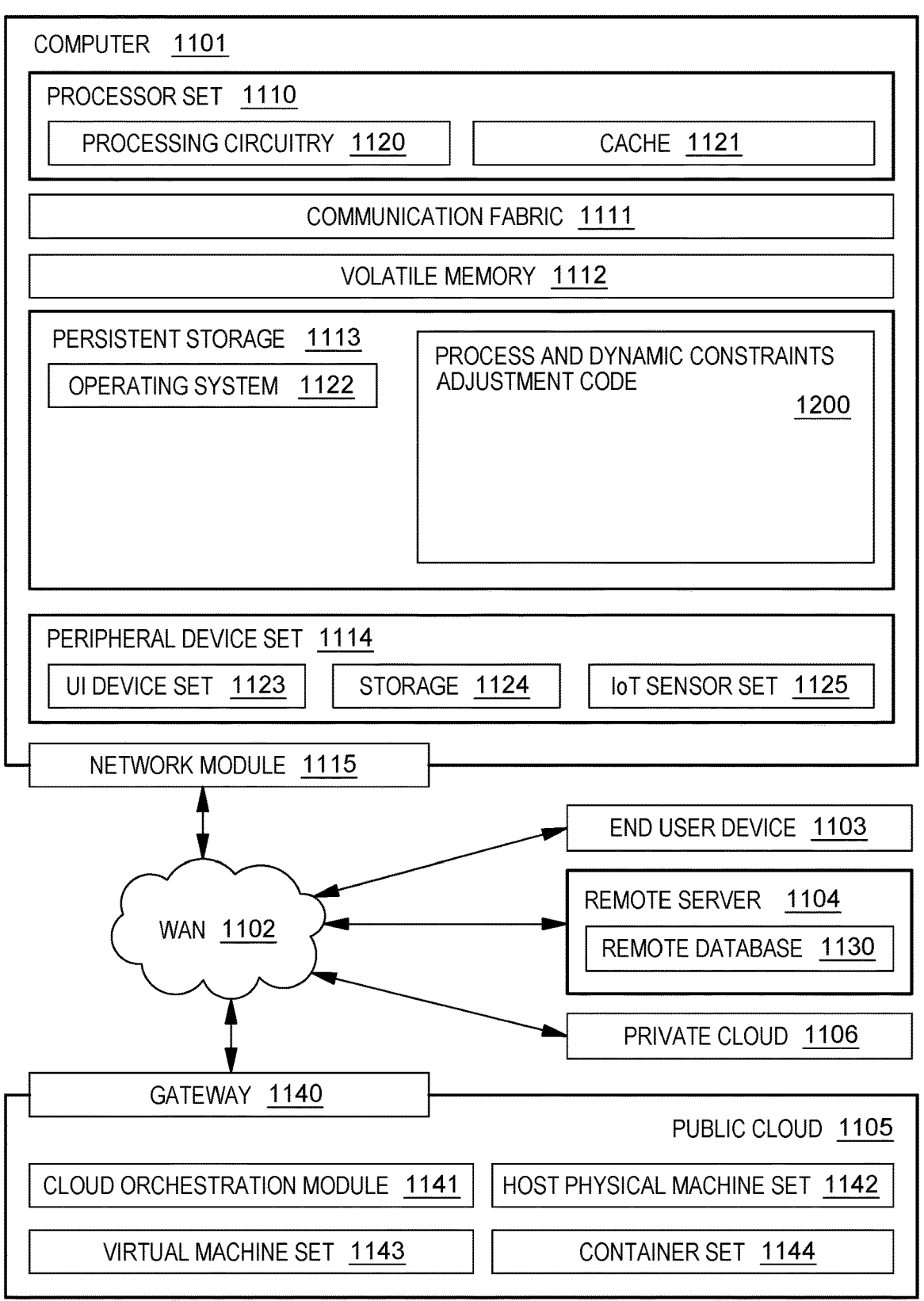
FIG. 11 depicts another example of a computing environment to incorporate and/or use one or more aspects of the present invention.

Referring to FIG. 11, a computing environment 1100 contains an example of an environment for the execution of at least some of the computer code involved in performing the inventive methods, such as process and dynamic constraints adjustment code 1200. In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

Computer 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

Processor set 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

Communication fabric 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

Persistent storage 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1200 typically includes at least some of the computer code involved in performing the inventive methods.

Peripheral device set 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

Network module 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

Remote server 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

Public cloud 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The computing environments described herein are only examples of computing environments that can be used. Other environments, including but not limited to, non-partitioned environments, partitioned environments, cloud environments, distributed environments, non-distributed environments, virtual environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to provide an automatic optimization process for dynamic feedback adjustment of one or more constraints and/or to perform to one or more other aspects of the present invention.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, additional, fewer and/or other features, constraints, tasks and/or events may be considered. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of dynamic processing within a computing environment, the computer-implemented method comprising:

executing an automated process on one or more processors of the computing environment to dynamically generate a task solution for a selected event using data stored in a selected form in one or more data structures generated for the automated process by at least one processing engine of the one or more processors, the selected event being a complex real-world event and the selected form to facilitate retrieval and use of the data, the data including constraints data generated and stored in a data structure of the one or more data structures based on one or more defined tasks of the complex real-world event, the executing the automated process including:

retrieving, by a dynamic feedback controller executing on at least one processor of the one or more processors of the computing environment, the constraints data stored in the data structure, the constraints data including a set of constraints for a defined task to be performed for the selected event, the set of constraints having one or more levels of constraints generated and assigned thereto by a restriction condition sorter processing engine of the one or more processors, the one or more levels of constraints to be used in constraint prioritization, and the restriction condition sorter processing engine executing a selected machine learning model used in generating and assigning the one or more levels of constraints;

sending, by the dynamic feedback controller to a solution generator executing on at least one processor of the one or more processors, the constraints data retrieved from the data structure generated by the at least one processing engine based on the defined task to be performed for the selected event the solution generator used to obtain a task solution to specify how to perform the defined task for the selected event, the task solution to satisfy one or more defined criteria defined for the selected event;

obtaining, by the dynamic feedback controller, one or more task solutions generated by the solution generator for the defined task, the one or more task solutions generated using the constraints data that is retrieved by the dynamic feedback controller from the data structure generated based on the defined task to be performed for the selected event;

determining, by the dynamic feedback controller, whether the one or more task solutions include the task solution that satisfies the one or more defined criteria;

automatically adjusting, by the dynamic feedback controller, the set of constraints to provide an adjusted set of constraints, based on determining that the one or more task solutions do not include the task solution that satisfies the one or more defined criteria, the dynamic feedback controller using in the automatically adjusting a machine learning model trained to automatically adjust the set of constraints, the machine learning model indicating one or more constraints of the set of constraints to be adjusted by the dynamic feedback controller;

sending from the dynamic feedback controller to the solution generator the adjusted set of constraints that are adjusted using the machine learning model executed by the dynamic feedback controller, the adjusted set of constraints being provided by the dynamic feedback controller to the solution generator based on the automatically adjusting and received as input to the solution generator for use in generating one or more other task solutions, and wherein the adjusted set of constraints generated based on the automatically adjusting and using the machine learning model executed by the dynamic feedback controller is used to retrain the selected machine learning model executed by the restriction condition sorter processing engine used to generate and assign the one or more levels of constraints;

iteratively performing, by the dynamic feedback controller one or more times, at least, the obtaining and the determining to obtain the task solution that satisfies the one or more defined criteria defined for the selected event, wherein the one or more task solutions of the obtaining and the determining include the one or more other task solutions;

obtaining, by the dynamic feedback controller, the task solution to specify how to perform the defined task for the selected event; and outputting, by the dynamic feedback controller, at least an indication of the task solution, the task solution to be used to implement and perform the defined task for the selected event.

2. The computer-implemented method of claim 1, further comprising implementing the task solution that is output to perform the defined task.

3. The computer-implemented method of claim 1, wherein a another data structure of the one or more data structures includes one or more features and one or more indicated priorities for the one or more features, and wherein at least a portion of the one or more features is specific to the selected event.

4. The computer-implemented method of claim 3, wherein the one or more features include at least one default feature, at least one custom feature, and at least one feature specific to the solution generator.

5. The computer-implemented method of claim 3, wherein the data structure of the one or more data structures includes a constraints data structure that includes the set of constraints for the selected event, the set of constraints including one or more constraints for at least one feature of the one or more features and one or more respective priorities for the one or more constraints.

6. The computer-implemented method of claim 1, wherein the automatically adjusting the set of constraints includes automatically removing one of the constraints from the set of constraints.

7. The computer-implemented method of claim 6, wherein the automatically removing one of the constraints from the set of constraints is based on priority of constraints in the set of constraints.

8. The computer-implemented method of claim 1, wherein the automatically adjusting the set of constraints includes automatically adjusting one or more respective priorities of one or more constraints of the set of constraints.

9. The computer-implemented method of claim 1, further comprising generating by a generator executing on at least one processor of the one or more processors the one or more data structures based on information obtained by the generator using one or more templates created for the defined task of the selected event, the generator being a processing engine of the at least one processing engine.

10. The computer-implemented method of claim 1, wherein the defined task comprises routing within the computing environment and the selected event comprises an event in which the routing is performed, and wherein at least one defined criteria of the one or more defined criteria is related to computing resources.

11. A computer system for dynamic processing within a computing environment, the computer system comprising:

a memory; and one or more processors in communication with the memory, wherein the computer system is configured to perform a method, said method comprising:

executing an automated process on the one or more processors to dynamically generate a task solution for a selected event using data stored in a selected form in one or more data structures generated for the automated process by at least one processing engine of the one or more processors, the selected event being a complex real-world event and the selected form to facilitate retrieval and use of the data, the data including constraints data generated and stored in a data structure of the one or more data structures based on one or more defined tasks of the complex real-world event, the executing the automated process including:

retrieving, by a dynamic feedback controller executing on at least one processor of the one or more processors, constraints data stored in the data structure, the constraints data including a set of constraints for a defined task to be performed for the selected event, the set of constraints having one or more levels of constraints generated and assigned thereto by a restriction condition sorter processing engine of the one or more processors, the one or more levels of constraints to be used in constraint prioritization, and the restriction condition sorter processing engine executing a selected machine learning model used in generating and assigning the one or more levels of constraints;

sending, by the dynamic feedback controller to a solution generator executing on at least one processor of the one or more processors, the constraints data retrieved from the data structure generated by the at least one processing engine based on the defined task to be performed for the selected event, the solution generator to be used to obtain a task solution to specify how to perform the defined task for the selected event, the task solution to satisfy one or more defined criteria defined for the selected event;

obtaining, by the dynamic feedback controller, one or more task solutions generated by the solution generator for the defined task, the one or more task solutions generated using the constraint data that is retrieved by the dynamic feedback controller from the data structure generated based on the defined task to be performed for the selected event;

determining, by the dynamic feedback controller, whether the one or more task solutions include the task solution that satisfies the one or more defined criteria;

automatically adjusting, by the dynamic feedback controller, the set of constraints to provide an adjusted set of constraints, based on determining that the one or more task solutions do not include the task solution that satisfies the one or more defined criteria, the dynamic feedback controller using in the automatically adjusting a machine learning model trained to automatically adjust the set of constraints, the machine learning model indicating one or more constraints of the set of constraints to be adjusted by the dynamic feedback controller;

sending from the dynamic feedback controller to the solution generator the adjusted set of constraints that are adjusted using the machine learning model executed by the dynamic feedback controller, the adjusted set of constraints being provided by the dynamic feedback controller to the solution generator based on the automatically adjusting and received as input to the solution generator for use in generating one or more other task solutions, and wherein the adjusted set of constraints generated based on the automatically adjusting and using the machine learning model executed by the dynamic feedback controller is used to retrain the selected machine learning model executed by the restriction condition sorter processing engine used to generate and assign the one or more levels of constraint;

iteratively performing, by the dynamic feedback controller one or more times, at least, the obtaining and the determining to obtain the task solution that satisfies the one or more defined criteria defined for the selected event, wherein the one or more task solutions of the obtaining and the determining include the one or more other task solutions;

obtaining, by the dynamic feedback controller, the task solution to specify how to perform the defined task for the selected event; and outputting, by the dynamic feedback controller, at least an indication of the task solution, the task solution to be used to implement and perform the defined task for the selected event.

12. The computer system of claim 11, wherein the method further comprises implementing the task solution that is output to perform the defined task.

13. The computer system of claim 11, wherein another data structure of the one or more data structures includes one or more features and one or more indicated priorities for the one or more features, and wherein at least a portion of the one or more features is specific to the selected event.

14. The computer system of claim 13, wherein the one or more features include at least one default feature, at least one custom feature, and at least one feature specific to the solution generator.

15. The computer system of claim 13, wherein the data structure of the one or more data structures includes a constraints data structure that includes the set of constraints for the selected event, the set of constraints including one or more constraints for at least one feature of the one or more features and one or more respective priorities for the one or more constraints.

16. A computer program product for dynamic processing within a computing environment, said computer program product comprising:

one or more computer readable storage media and program instructions collectively stored on the one or more computer readable storage media readable by at least one processing circuit to perform a method comprising:

executing an automated process on one or more processors of the computing environment to dynamically generate a task solution for a selected event using data stored in a selected form in one or more data structures generated for the automated process by at least one processing engine of the one or more processors, the selected event being a complex real-world event and the selected form to facilitate retrieval and use of the data, the data including constraints data generated and stored in a data structure of the one or more data structures based on one or more defined tasks of the complex real-world event, the executing the automated process including:

retrieving, by a dynamic feedback controller executing on at least one processor of the one or more processors of the computing environment, the constraints data stored in the data structure, the constraints data including a set of constraints for a defined task to be performed for the selected event the set of constraints having one or more levels of constraints generated and assigned thereto by a restriction condition sorter processing engine of the one or more processors, the one or more levels of constraints to be used in constraint prioritization, and the restriction condition sorter processing engine executing a selected machine learning model used in generating and assigning the one or more levels of constraints;

sending, by the dynamic feedback controller to a solution generator executing on at least one processor of the one or more processors, the constraints data retrieved from the data structure generated by the at least one processing engine based on the defined task to be performed for the selected event, the solution generator to be used to obtain a task solution to specify how to perform the defined task for the selected event, the task solution to satisfy one or more defined criteria defined for the selected event;

obtaining, by the dynamic feedback controller, one or more task solutions generated by the solution generator for the defined task, the one or more task solutions generated using the constraints data that is retrieved by the dynamic feedback controller from the data structure generated based on the defined task to be performed for the selected event;

determining, by the dynamic feedback controller, whether the one or more task solutions include the task solution that satisfies the one or more defined criteria;

automatically adjusting, by the dynamic feedback controller, the set of constraints to provide an adjusted set of constraints, based on determining that the one or more task solutions do not include the task solution that satisfies the one or more defined criteria, the dynamic feedback controller using in the automatically adjusting a machine learning model trained to automatically adjust the set of constraints, the machine learning model indicating one or more constraints of the set of constraints to be adjusted by the dynamic feedback controller;

sending from the dynamic feedback controller to the solution generator the adjusted set of constraints that are adjusted using the machine learning model executed by the dynamic feedback controller, the adjusted set of constraints being provided by the dynamic feedback controller to the solution generator based on the automatically adjusting and received as input to the solution generator for use in generating one or more other task solutions, and wherein the adjusted set of constraints generated based on the automatically adjusting and using the machine learning model executed by the dynamic feedback controller is used to retrain the selected machine learning model executed by the restriction condition sorter processing engine used to generate and assign the one or more levels of constraints;

iteratively performing, by the dynamic feedback controller one or more times, at least, the obtaining and the determining to obtain the task solution that satisfies the one or more defined criteria defined for the selected event, wherein the one or more task solutions of the obtaining and the determining include the one or more other task solutions;

obtaining, by the dynamic feedback controller, the task solution to specify how to perform the defined task for the selected event; and outputting, by the dynamic feedback controller, at least an indication of the task solution, the task solution to be used to perform the defined task for the selected event.

17. The computer program product of claim 16, wherein the method further comprises implementing the task solution that is output to perform the defined task.

18. The computer program product of claim 16, wherein another data structure of the one or more data structures includes one or more features and one or more indicated priorities for the one or more features, and wherein at least a portion of the one or more features is specific to the selected event.

19. The computer program product of claim 18, wherein the one or more features include at least one default feature, at least one custom feature, and at least one feature specific to the solution generator.

20. The computer program product of claim 18, wherein the data structure of the one or more data structures includes a constraints data structure that includes the set of constraints for the selected event, the set of constraints including one or more constraints for at least one feature of the one or more features and one or more respective priorities for the one or more constraints.

* * * * *